United States Patent [19]

Bolliger et al.

[11] 4,274,253

[45] Jun. 23, 1981

[54] CONTROL FOR TURBINE AND RECUPERATOR INLET TEMPERATURES

[75] Inventors: Frederic E. Bolliger; Geoffrey D. Woodhouse, both of Phoenix; George B. Mattson, Scottsdale; Bruce S. Anson, Phoenix, all of Ariz.; Robert A. Hatch, Boca Raton, Fla.

[73] Assignee: The Garrett Corporation, Los Angeles, Calif.

[21] Appl. No.: 863,365

[22] Filed: Dec. 22, 1977

[51] Int. Cl.³ .............................. F02C 9/02; F02C 9/04
[52] U.S. Cl. .................................. 60/39.03; 60/39.04; 60/39.16 R; 60/39.25; 60/39.28 R
[58] Field of Search .................. 60/39.28 R, 39.28 P, 60/39.25, 39.16 R, 39.03, 39.04

[56] References Cited

U.S. PATENT DOCUMENTS

| | | | |
|---|---|---|---|
| 3,199,293 | 8/1965 | Starkey | 60/39.25 |
| 3,383,090 | 5/1968 | McLean | 60/39.25 |
| 3,521,446 | 7/1970 | Maljanian | 60/39.25 |
| 3,606,754 | 9/1971 | White | 60/39.14 R |
| 3,952,502 | 4/1976 | Davis et al. | 60/39.25 |
| 3,999,374 | 12/1976 | Oppmann et al. | 60/39.16 R |

Primary Examiner—Robert E. Garrett
Attorney, Agent, or Firm—James W. McFarland; Albert J. Miller

[57] ABSTRACT

A recuperated gas turbine engine control and method which provides improved idling and limits both turbine inlet temperature and recuperator inlet temperature to different, preselected maximum levels.

6 Claims, 22 Drawing Figures

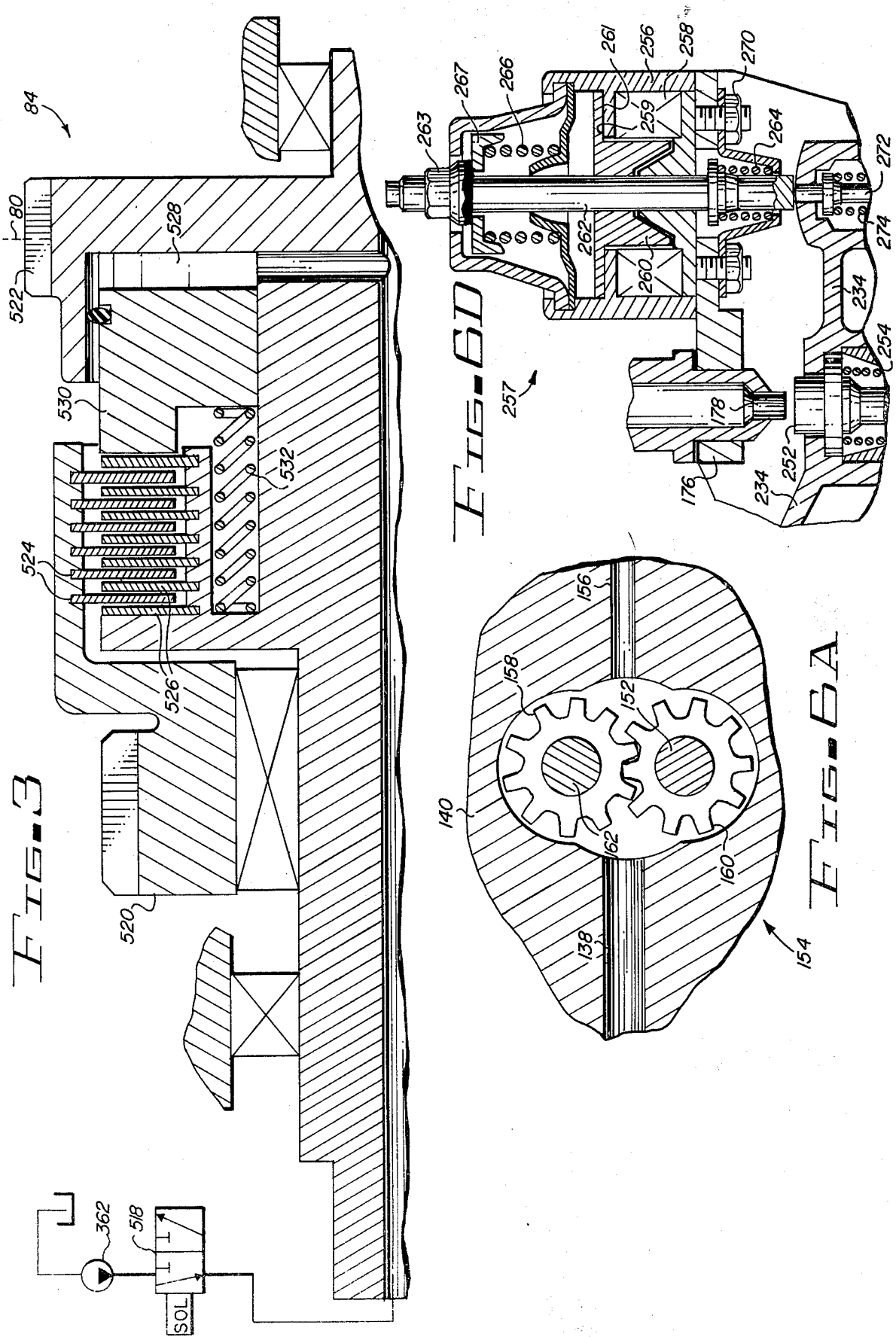

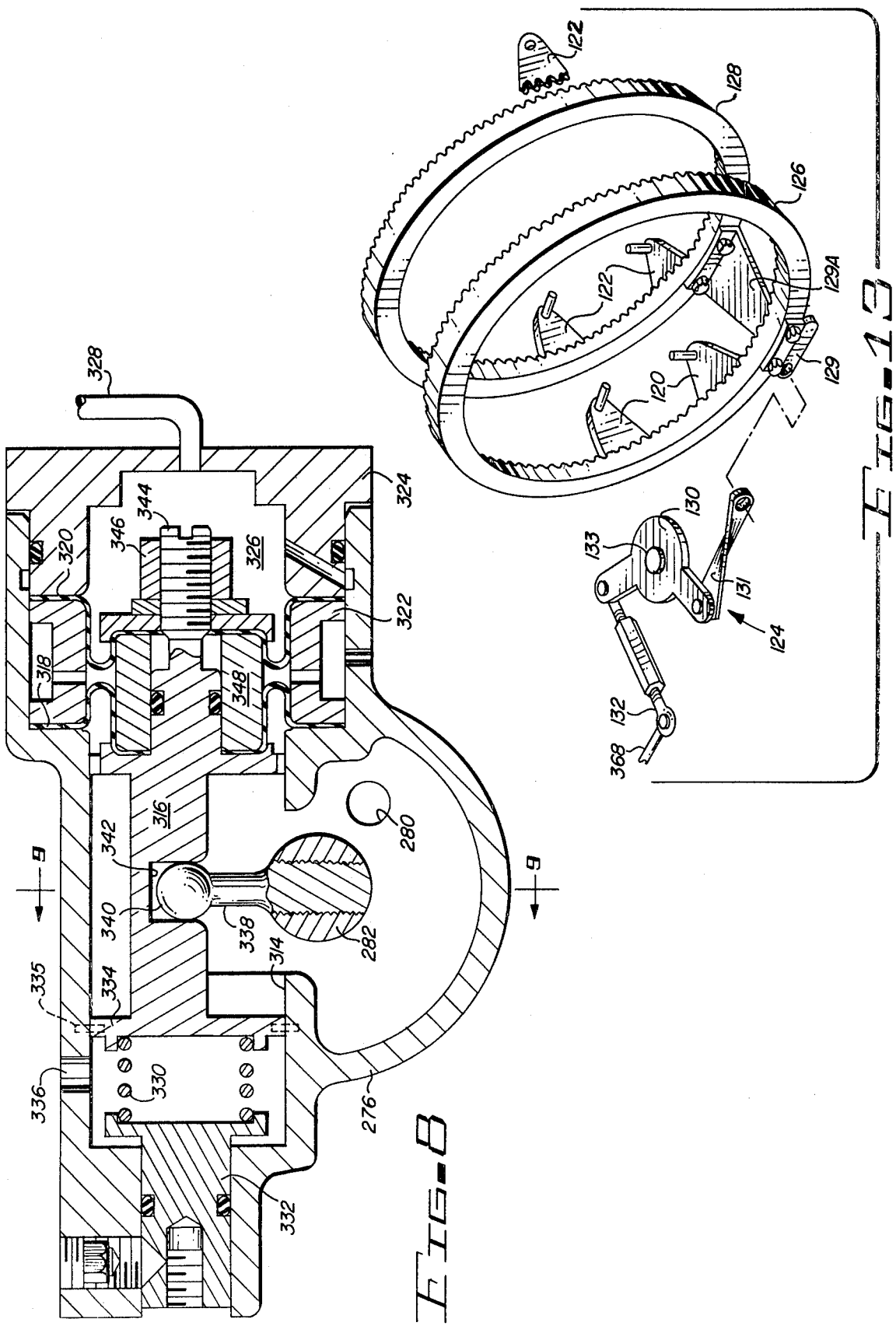

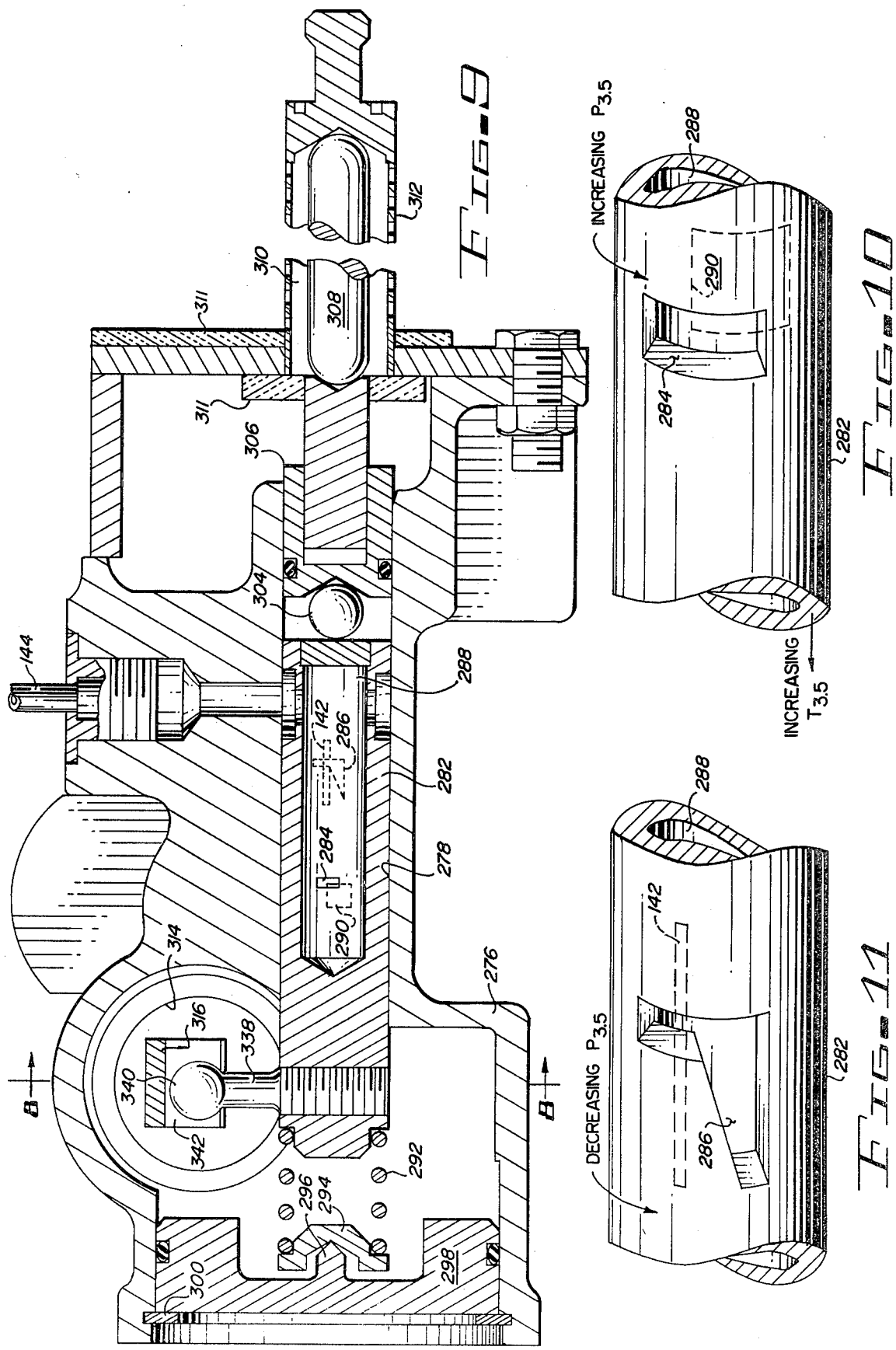

CONTROL FOR TURBINE AND RECUPERATOR INLET TEMPERATURES

CROSS-REFERENCE TO RELATED APPLICATIONS

Cross reference is made to the following co-pending U.S. Patent applications, having common assignee with the present application, all filed concurrently herewith and entitled "Gas Turbine Engine," and which relate to subject matter common with that disclosed in the present application:

Ser. No. 863,361 of Woodhouse, et al;
Ser. No. 863,570 of Jansen, et al;
Ser. No. 863,495 of Hatch, et al;
Ser. No. 863,375 of Mattson, et al;
Ser. No. 863,370 of Parker, et al;
Ser. No. 863,198 of Wiher, et al;
Ser. No. 863,205 of Sumegi, et al.

BACKGROUND OF THE INVENTION

This invention relates to gas turbine engines, and relates more particularly to an improved gas turbine engine and method and control therefor particularly useful as the power plant for a ground vehicle.

Recent advances in gas turbine engine technology have improved their overall efficiency and economy to such an extent that this type of power plant has become competitive in many instances with more conventional internal combustion type power plants such as Otto or Diesel cycle engines. For instance, gas turbine technology has made significant inroads as the power plant for aircraft engines. Similarly, attempts have been made to develop a gas turbine engine which would be competitive with the more conventional internal combustion engines in high-production ground vehicles such as on-the-road automobiles and heavy trucks. The gas turbine offers significant advantages of equivalent or better operational efficiency, fuel savings, and less emissions as well as being able to utilize a variety of different fuels on an economic basis. Further, the gas turbine engine in many instances offers greater overall economy over the entire operational life of a vehicle.

The inherent operational characteristics of a gas turbine engine present, however, certain problems when utilized in a ground vehicle. More specifically, a gas turbine engine generally includes a gas generator section which provides a large pressurized air flow to a combustor wherein the air flow is mixed and ignited with fuel to greatly increase the temperature of the resulting gas flow. Hot pressurized gas flow then drives one or more turbines to produce useful rotary mechanical output power. Normally one of these turbines is a portion of the gas generator section for driving the fan which provides the high volume pressurized air inlet flow. Downstream power output turbines then generate the useful mechanical power output. Conventionally, the high speed, high volume gas flow from the gas generator drives the turbines at relatively high speeds. Other inherent characteristics of such gas turbine engines relates to the thermodynamic and aerodynamic processes carried out therewithin which dictate that operational efficiency of the engine increases substantially with increasing maximum temperature of the gas flow.

These operating characteristics of a gas turbine engine present certain disadvantages in comparison to the normal operation of reciprocating or rotary piston type internal combustion engines for ground vehicles. More particularly, the internal combustion engine inherently provides a substantial amount of deceleration horsepower for the vehicle upon reducing fuel flow thereto through the drag imposed by the reciprocating portion of the engine. In contrast, the high rotational inertia of the turbines of the gas turbine engine normally do not permit such immediate, relatively high horsepower braking for a ground vehicle simply upon reducing fuel flow to the combustor of the gas turbine engine. To overcome this disadvantage, a variety of proposals have been offered in the past to increase the braking characteristics of a gas turbine engine when utilized for driving a ground vehicle. Primarily, these concepts relate to completely extinguishing the combustion process within the combustor to produce maximum dynamic braking. However, operational life of a gas turbine engine is substantially reduced by continual thermal cycling of the entire engine as created upon extinguishing the combustion process. Further, such approaches adversely affect emissions. Other concepts relating to improving the dynamic braking characteristics of a gas turbine engine revolve around the utilization of a "fixed shaft" type of gas turbine engine wherein the gas generator section and the power drive section are mechanically interconnected to drive the vehicle. While such an arrangement improves the dynamic braking, it greatly reduces the adaptability of the engine to perform various other processes for driving a ground vehicle, and due to this limited adaptability has met with limited success in use as the power source for a high-production type of ground vehicle. An example of such prior art structure is found in U.S. Pat. No. 3,237,404. The normal method for dynamic braking in gas turbine powered aircraft, thrust reversal, is of course not readily applicable to ground vehicles.

Prior arrangements for gas turbine engines for ground vehicles also have suffered from the disadvantage of not providing efficient, yet highly responsive acceleration in comparison to internal combustion engines. Inherently, a free turbine engine normally requires a substantially longer time in developing the maximum torque required during acceleration of the ground vehicle. Prior attempts to solve this problem have centered about methods such as operating the gas generator at a constant, maximum speed, or other techniques which are equally inefficient in utilization of fuel. Overall, prior gas turbine engines for ground vehicles normally have suffered from a reduced operational efficiency in attempting to improve the acceleration or deceleration characteristics of the engine, and or resulted in reduced efficiency by substantially varying the turbine inlet temperature of the gas turbine engine which is a primary factor in the fuel consumption of the engine. Further, prior art attempts have generally been deficient in providing a reliable type of control system which is effective throughout all operational modes of a gas turbine engine when operating a ground vehicle to produce safe, reliable, operating characteristics. Further, such prior art gas turbine engines have resulted in control arrangements which present a substantial change in required operator actions in comparison to driving an internal combustion powered vehicle.

Other problems related to prior art attempts to produce a gas turbine engine for ground vehicle relate to the safety and reliability of the control system in various failure modes, safe and reliable types of controls, and in the overall operational efficiency of the engine. A majority of these problems may be considered as an outgrowth of attempts to provide a gas turbine engine presenting operational characteristics duplicative of the desirable, inherent actions of an internal combustion engine.

Accordingly, it will be seen that it would be highly desirable to provide a gas turbine engine and associated controls which incorporate the desirable operational features of both a gas turbine and internal combustion engine, but while providing an economical end product of sufficiently reliable and safe design for high volume production basis for ground vehicles.

Discussions of exemplary prior art structure relating to the engine of the present invention may be found in U.S. Pat. Nos. 3,237,404 discussed above; 3,660,976; 3,899,877; 3,941,015 all of which appear to relate to schemes for transmitting motive power from the gas generator to the engine output shaft, and U.S. Pat. Nos. 3,688,605; 3,771,916 and 3,938,321 that relate to other concepts for vehicular gas turbine engines. Examples of concepts for variable nozzle engines may also be found in U.S. Pat. Nos. 3,686,860; 3,780,527 and 3,777,479. Prior art fuel governor controls in the general class of that contemplated by the present invention may be found in U.S. Pat. Nos. 3,400,535; 3,508,395; 3,568,439; 3,712,055; 3,777,480 and 3,913,316, none of which incorporate reset and override features as contemplated by the present invention; and U.S. Pat. No. 3,521,446 which discloses a substantially more complex fuel reset feature than that of the present invention. Examples of other fuel controls less pertinent to the present invention may be found in U.S. Pat. Nos. 3,851,464 and 3,888,078. U.S. Pat. No. 3,733,815 relates to the automatic idle reset feature of the present invention while U.S. Pat. Nos. 2,976,683; 3,183,667 and 3,820,323 relate to the scheduling valve controls.

SUMMARY OF THE INVENTION

An important object of the present invention is to provide an improved gas turbine engine and method and more particularly arrangements exhibiting desirable operational features normally inherent to piston engines.

Another important object is to provide provisions producing improved fuel performance in a variety of operations of a ground vehicle driven by a gas turbine engine.

Another important object of the present invention is to provide improved acceleration, deceleration characteristics for a gas turbine driven ground vehicle, and to provide a more reliable, longer life gas turbine engine for propulsion or power generating purposes.

In summary, the invention contemplates a recuperated, free turbine type engine with separate gas generator and power turbine sections. A fuel governor controls fuel flow to the combustor to set gas generator speed in relation to the throttle lever. Reset solenoids can override and adjust fuel flow in response to certain operating parameters or conditions of engine operation. For instance, in response to low speed on the output shaft of the drive train clutch which is indicative of an impending desired engine acceleration for increased torque output, a reset solenoid increases fuel flow and the gas generator idle speed to substantially reduce time required in increasing engine torque output. A scheduling valve is effective to control fuel flow during engine acceleration to prevent excessive recuperator inlet temperature and maintain turbine inlet temperature at a substantially constant, high level for maximum engine performance. The scheduling valve is responsive to combustor inlet gauge pressure and temperature, and also controls fuel flow during deceleration in a manner maintaining combustion. Variable turbine guide vanes are shifted first to maximize power delivered to the gas generator during its acceleration, and subsequently are shifted toward a position delivering maximum power to the power turbine section. The variable guide vane control includes a hydromechanical portion capable of controlling power turbine section speed in relation to throttle position, and has an electromechanical portion cooperable therewith to place the guide vanes in a braking mode for deceleration. Power feedback is incorporated to provide yet greater braking characteristics. When such is selected, the gas generator speed is automatically adjusted to approach power turbine speed, then through a relatively low power rated clutch the gas generator and power turbine sections are mechanically interconnected such that the rotational inertia of the gas generator section assists in retarding the engine output shaft.

These and other objects and advantages of the present invention are set forth in or will become apparent from the following detailed description of a preferred embodiment when read in conjunction with the accompanying drawings.

BRIEF DESCRIPTION OF THE DRAWINGS

In the drawings:

FIG. 3 is a fragmentary, partially schematic, elevational cross-section of the power feedback clutch and associated hydraulic system, taken generally along lines 3—3 of FIG. 2;

FIG. 6a is an enlarged partial elevational cross-sectional view of the fuel pump taken generally along lines 6a—6a of FIG. 6;

FIGS. 6b, 6c, 6d are enlarged cross-sectional views of a portion of the fuel governor control showing different operational positions of solenoid 257;

FIG. 8 is a plan cross-sectional view through one portion of the scheduling valve;

FIG. 9 is a plan cross-sectional view of the scheduling valve taken generally along lines 9—9 of FIG. 8;

FIGS. 10 and 11 are enlarged views of portions of valve 282 showing the interrelationship of fuel metering passages as would be viewed respectively along lines 10—10 and 11—11 of FIG. 7;

FIG. 13 is an exploded perspective illustration of the guide vanes and actuator linkage;

DETAILED DESCRIPTION OF THE PREFERRED EMBODIMENT

With reference to the figures, listed below are the abbreviations utilized in the following detailed description to denote various parameters:

$N_{pt}$ = Power Turbine 54 Speed
$N_{gg}$ = Gas Generator 52 Speed
$N_{gg*}$ = Preselected Gas Generator 52 Speed
$N_{ti}$ = Transmission Input Shaft 36 Speed
e = Predetermined Minimum Speed of Transmission Input Shaft 36
$W_f$ = Fuel flow
B = Stator Vane 120, 122 Angle
B* = Predetermined Stator Vane Angle
a = Throttle 184 Position
a* = Predetermined Throttle Position
$T_2$ = Compressor Inlet Temperature
$P_2$ = Ambient Pressure
$T_{3.5}$ = Combustor Inlet Temperature
$P_{3.5}$ = Combustor Pressure
$P_{3.5*}$ = Preselected Intermediate Value of Combustor Pressure
$T_4$ = Turbine Inlet Temperature
$T_6$ = Turbine Exhaust Temperature

ENGINE 30

Figure 1:
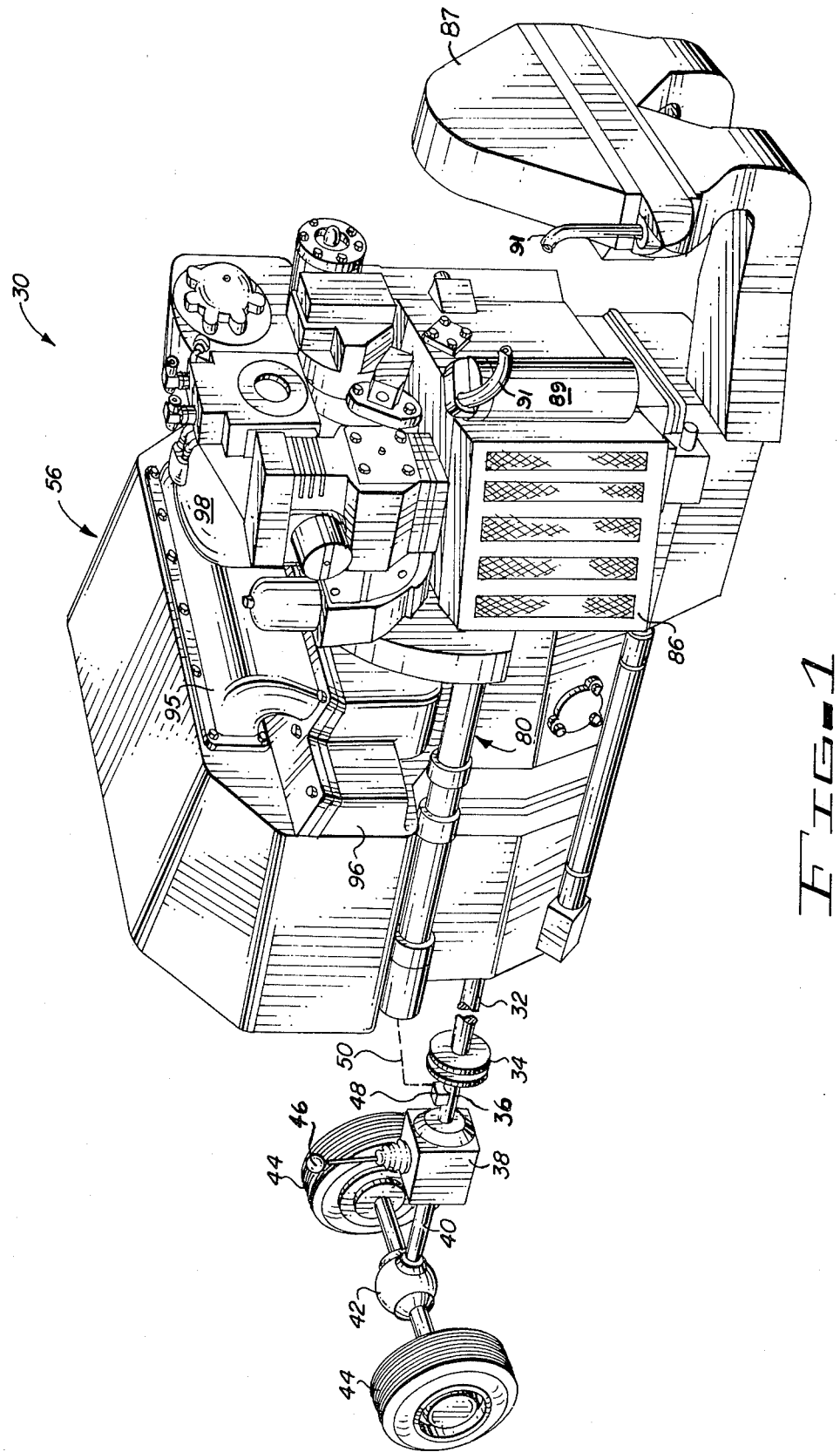
FIG. 1 is a left front perspective illustration of a gas turbine engine and associated drive train embodying the principles of the present invention.
Figure 2:
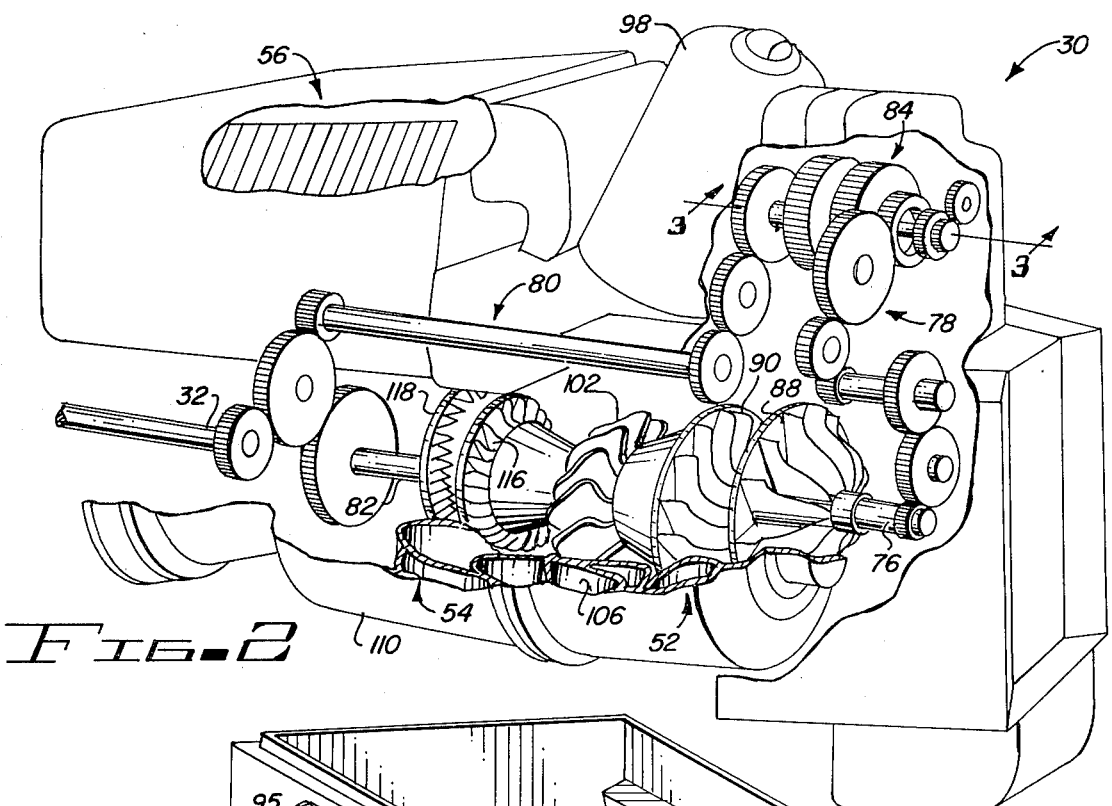
FIG. 2 is a perspective illustration of the power feedback drive train as incorporated in the engine with portions of the engine shown in outline form.

Referring now more particularly to the drawings, an improved gas turbine engine as contemplated by the present invention is generally denoted by the numeral 30. As depicted in FIG. 1 the engine is coupled to a substantially standard drive train for a vehicle, particularly a truck in the 450 to 600 horsepower class, with a power output shaft 32 as the input to a drive train clutch 34. A transmission input shaft 36 extends between the clutch 34 and a "change speed" type of transmission 38. Transmission 38 is of the manually shiftable gear type; however, it is to be understood that various improvements of the present invention are equally usable with other types of speed varying transmissions. As is conventional the transmission 38 has a variety of different positions including several forward gears, reverse gearing, and a neutral position. In the neutral position no power is transmitted between the transmission input shaft 36 and the transmission output shaft 40 which conventionally extends to the final drive 42 and drive wheels 44 of the vehicle. A manual shifting lever 46 provides selection of the desired gear ratio, and a speed sensor 48 generates a signal indicative of the speed of transmission input shaft 36. As schematically depicted in FIG. 1 and described in greater detail hereinbelow, the speed sensor 48 may be of any type compatible with the control medium of the engine 30. Preferably, speed sensor 48 generates an electrical signal transmitted by conductor 50 to the electronic control module of the engine.

Referring to FIGS. 1-4, engine 30 is of the free turbine, recuperated type incorporating a gas generator section 52, a power turbine 54 mounted on a shaft separate from that of the gas generator 52, and a recuperator 56 that scavanges waste heat from the exhaust flow from the engine for preheating the compressed fluid prior to the combustion process. The engine further generally includes a source 58 of combustible fuel, a fuel governor generally denoted by numeral 60 which also includes the fuel pump therein, a scheduling valve 62 for controlling fuel flow normally during acceleration or deceleration of the engine through a fuel line 64 extending to the gas generator section 52, and a control 66 for variably positioning variable stator vanes included in the power turbine section 54. An electronic control module 68 receives and processes various input parameter signals and produces output control signals to the governor 60 and vane actuator control 66.

Conventionally, there is included an electrical storage battery 70 and associated starter motor 72 which is preferably selectively coupled to both the gas generator 52 and a starter air pump 74. During starting operation, the motor 72 is energized to drive both an air starter pump 74 as well as the main gas generator shaft 76. As clearly illustrated in FIG. 2, the preferred form of the invention also includes a drive train 78 associated with gas generator shaft 76, and another drive train 80 associated with and driven by a main shaft 82 of the power turbine 54. The two drive trains 78 and 80 are selectively interengageable through a relatively low power, wet clutch generally denoted by the numeral 84. This clutch is generally referred to as the power feedback clutch and the structure thereof is described in detail below with respect to FIG. 3, while its functional operation is described further below with regard to the power feedback operation of the present invention.

Figure 5:
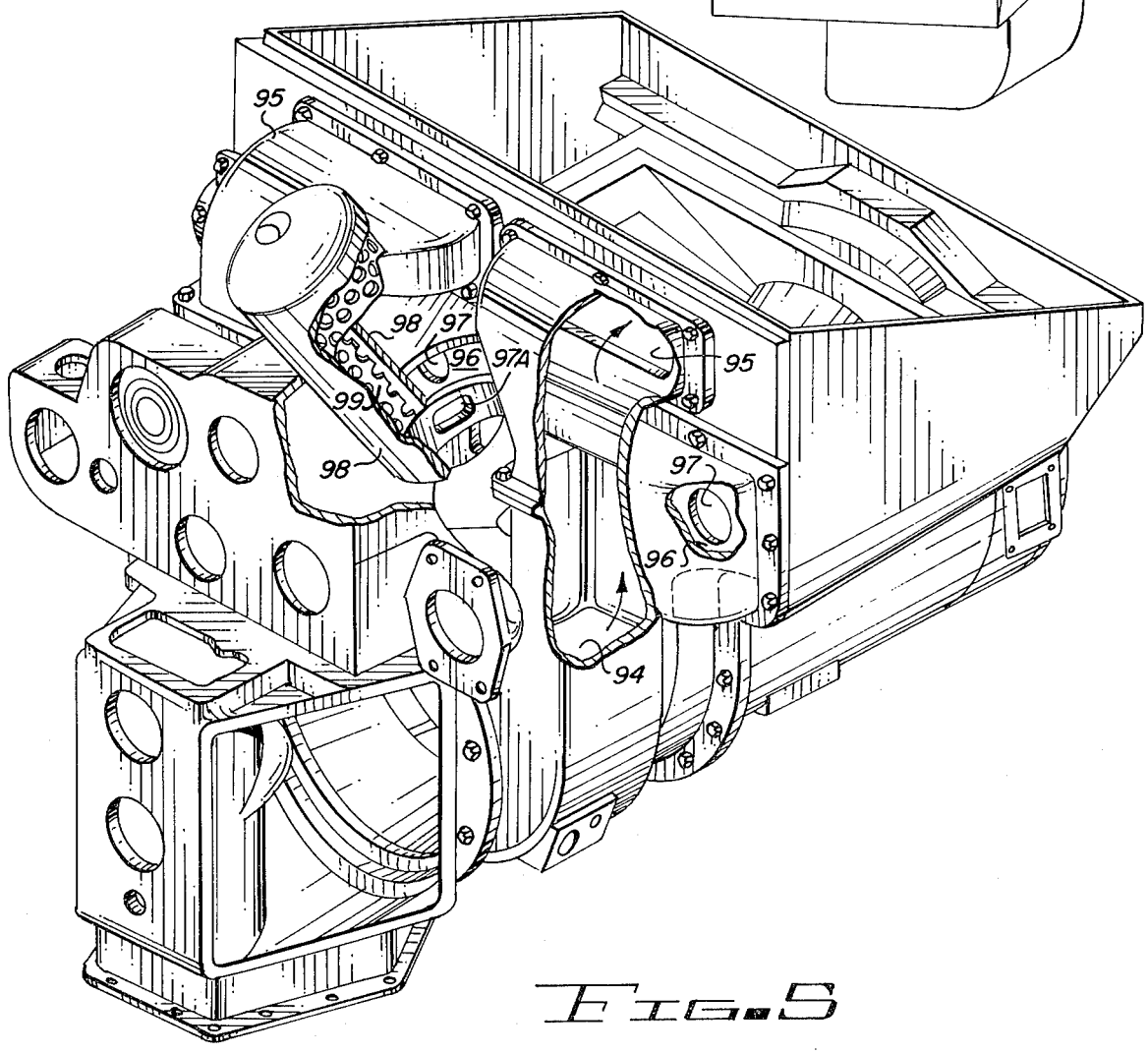
FIG. 5 is a right front perspective view of a portion of the housing, ducting passages and combustor of the engine with portions broken away to reveal internal details of construction; p

Gas generator 52 generally includes an appropriately filtered air inlet 86 through which ambient air is supplied to a pair of series arranged centrifugal compressors 88 and 90. Cross-over ducting 92 carries the compressed air flow from the first compressor 88 to the second compressor 90. The gas generator 52 further includes ducting 94 as depicted in FIG. 5 which surrounds and collects the compressed air flow exhaust from the circular periphery of the second stage compressor 90, and carries this compressed air flow in a pair of feeder ducts 95 to recuperator 56 in non-mixing, heat exchange relationship with the recuperator. While various forms of recuperator structure may be utilized in conjunction with the present invention, an exemplary form is as described in U.S. Pat. No. 3,894,581 entitled "Method of Manifold Construction for Formed Tube-Sheet Heat Exchanger", dated July 15, 1975, issued to Fred W. Jacobsen et al. Though not necessary to the understanding of the present invention, reference may be made to the above referenced patent for a detailed description of a recuperator and its operation. For purposes of the present invention, it is sufficient to state that the compressed air flow from ducts 95 is preheated in the recuperator by the waste heat from the exhaust flow from the engine. The preheated, compressed air flow is then ducted through duct 96 to a can-type combustor 98. As best seen in FIG. 5, heated flow from the recuperator passes through a plurality of openings 97 into a plenum portion of duct 96, then through openings 97a in a portion of the housing structure supporting combustor 98. Combustor 98 has a perforated inner liner 99, and airflow from openings 97a passes into the zone between the inner and outer liner to then pass through the perforated inner liner 99 into the combustor zone. One or more electrical ignition plugs 100 are suitably connected to a source of high voltage electrical energy in a conventional manner. The igniter plug is operable to maintain a continuous combustion process within the interior of the combustor wherein the fuel delivered from line 64 is mixed and burned with the compressed air flow from duct 96.

The gas generator 52 further includes a gas generator turbine 102 of the radial inflow type. The compressed, heated gas flow from combustor 98 is delivered across turbine inlet choke nozzles 104 disposed in a circular array about the annularly shaped inlet 106 to the gas generator turbine section. During engine operation, nozzles 104 maintain pressure in combustor 98 at a level higher than ambient. Flow of this heated, compressed gas across turbine 102 causes high speed rotation of the turbine and the gas generator main shaft 76. This rotation of course drives the two centrifugal compressors 88 and 90. Shaft 76 is appropriately mounted by bearings 108 to the stationary housing 110 of the engine.

Figure 14:
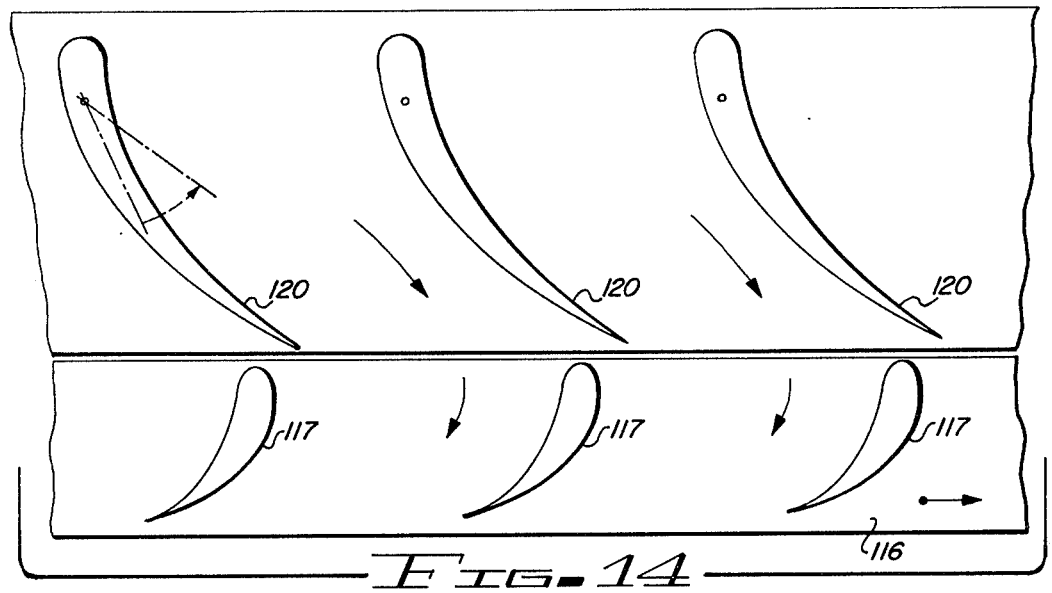
FIGS. 14, 15 and 16 are circumferential views showing various operational relationships between the variable guide vanes and the power turbine blades.
Figure 15:
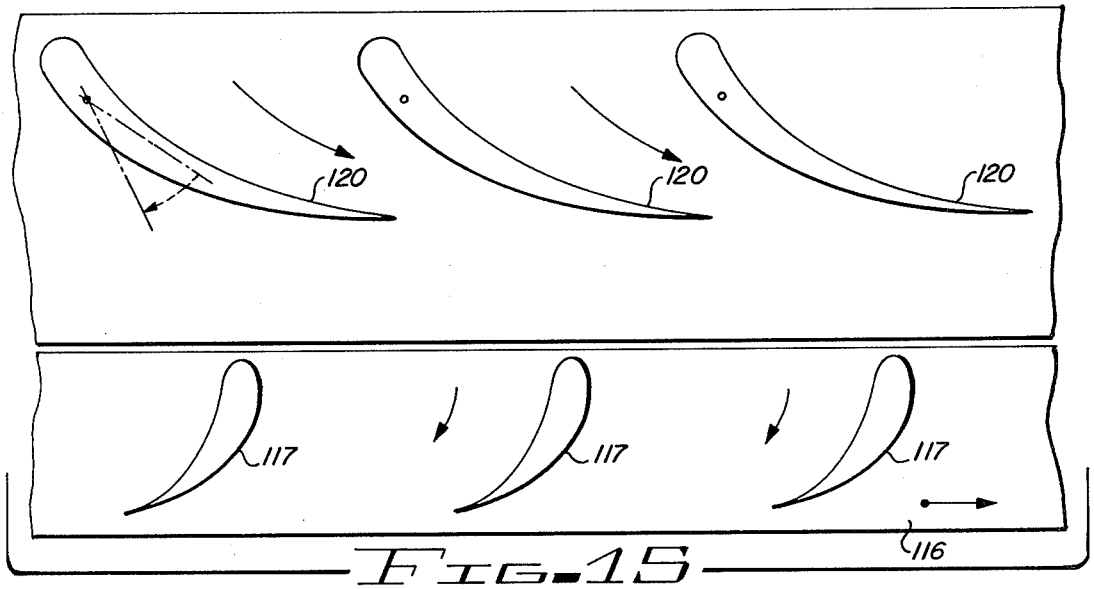
Figure 16:
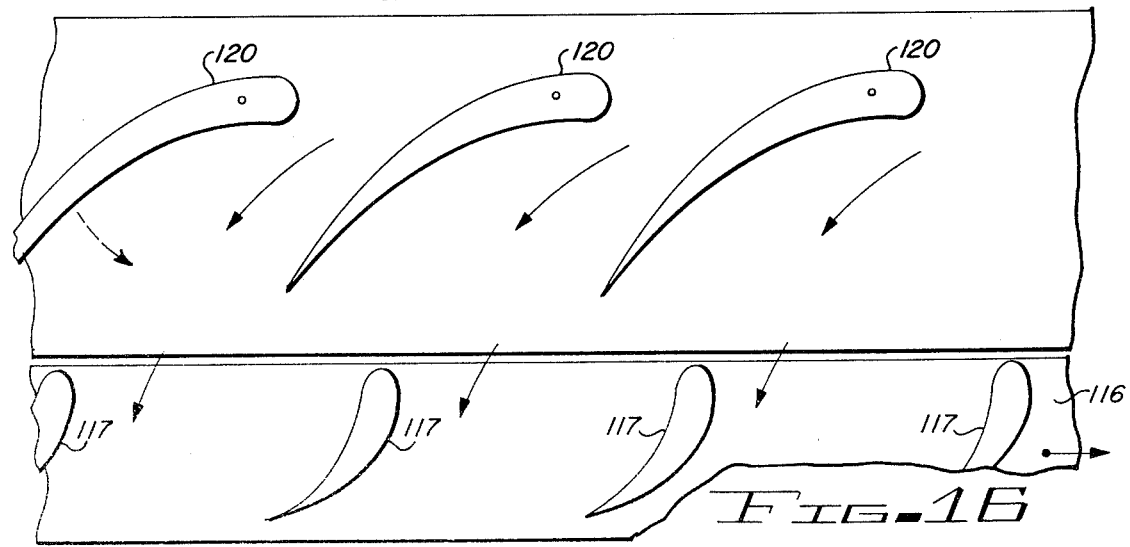

Power turbine section 54 generally includes a duct section 112 and appropriate vanes 114 therein for directing the flow of gases from the gas generator power turbine 102 toward a pair of axial power turbines 116 and 118 mounted to the power turbine main shaft 82. The power turbine section further includes sets 120 and 122 of variably positionable guide vanes respectively disposed upstream of associated axial turbines 116, 118 and their associated blades 117, 119. As depicted in FIG. 13, each of the sets of variable guide vanes 120 and 122 are disposed in an annular array within the gas flow path and are both mounted to a common actuating mechanism generally referred to by the numeral 124. The actuating mechanism 124 comprises a pair of ring gears 126 and 128, one for each set of variable vanes, a link 129 affixed to ring gear 126 and secured to ring gear 128 via plate 129a. Pivotally mounted to the housing is a bell crank 130, and a twisted link 131 has opposite ends pivotally attached to link 129 and one arm of bell crank 130. A linearly shiftable input shaft 368 acts through a pivot link 132 and another arm of the bell crank to cause rotation of crank 130 about its axis 133 and consequent simultaneous rotation of both ring gears 126, 128. Rotation of input shaft 368 rotates each of the ring gears 126, 128 about an axis coincident with the rotational axis of power driven shaft 82 to cause rotation of the two sets of guide vanes in unison to various positions relative to the direction of gas flow passing thereby. As shown in FIGS. 14-16, guide vanes 120 are positioned in a central or "neutral" position of FIG. 14 causing substantially maximum area ratio and minimum pressure ratio across the downstream power turbine wheel blades 117 of wheel 116 in order to minimize the amount of power transferred by the gas flow into rotation of the turbine 116. The FIG. 14 position is graphically illustrated by the position arbitrarily denoted 0° in FIG. 18. The guide vanes 120 are variably positioned toward the FIG. 15 position, noted as the +20° position in FIG. 18, wherein high pressure ratio exists across blades 117 and maximum power is transmitted from the gas flow to turbine 116 to rotate the latter and transmit maximum power to shaft 82. Also, the vanes are oppositely rotatable to the FIG. 16 position, noted as the −95° position of FIG. 18, wherein the gas flow is directed by the variable vanes 120 to oppose and tend to retard the rotation of wheel 116. While only vanes 120 and blades 117 are illustrated in FIGS. 14-16, it will be understood by those skilled in the art that substantially identical operational relationships exist between vanes 122 and turbine blades 119 of turbine 118.

The gas flow upon exiting the last axial turbine 118 is collected in an exhaust duct 134 which leads to the recuperator 56. The power turbine output shaft 82 is a part of or operably connected with the power output shaft 32 of the engine through appropriate speed reduction gearing. An air or water cooler 87 is also included to cool the lubricating fluid in engine 30 and communicates with fluid reservoir 89 through hose 91.

Fuel Governor 60

Referring now more particularly to FIGS. 4, 6, 6A-6D, the fuel governor 60 receives fuel from source 58 through an appropriate filter 136 into an inlet port 138 of a fuel pump housing 140. It will be apparent to those skilled in the art that the housing 140 is attached to and may be integrally formed with another portion of the main engine housing 110. The governor is operable to schedule fuel flow output through either or both of the output ducts 142, 144 for delivery to the scheduling valve 62. The governor 60 is hydromechanical in nature but capable of being responsive to externally applied mechanical and electrical signals, and includes an appropriate drive connection schematically illustrated by line 146, and associated speed reducing gearing 148 as necessary to drive a gear 150 and drive shaft 152. Shaft 152 drives a fuel pump in the form of a positive displacement rotary gear pump 154 which receives fuel from inlet port 138 and displaces it at a substantially higher pressure through an output conduit 156. As clearly illustrated in FIG. 6A, the gear pump comprises a pair of intermeshing geats 158 and 160, one of which is driven by drive shaft 152 and the other of which is mounted to an idler shaft 162 journaled within housing 140. Supplied in parallel flow arrangement from output conduit 156 are three passages, i.e. output duct 142, bypass bore 164, and main flow metering passage 166. Contained in bypass bore 164 is a bypass regulating valve poppet 168 slidable within bore 164 to variably meter excess flow from output conduit 156 to a return passage 170 connected back to the fuel inlet port 138. Pressure of fuel in bore 164 urges poppet 168 downwardly to increase bypass flow through passage 170, while a helical coil compression spring means 172 acts against the pressure of fuel to urge poppet 168 upwardly to reduce volume of flow from bore 164 to passage 170. Through a pressure passage 182 the lower end of bypass bore 164 communicates with fuel supply conduit 64. Thus, pressure of fluid in conduit 64 is exerted upon the lower side of bypass valve poppet 168 to assist spring 172 in opposing the force created by the high pressure fluid in output conduit 156. Passage 166 terminates in a metering nozzle 174 secured by plate 176 to the housing, and having a reduced diameter opening 178 communicating with a central cavity 180.

The fuel governor 60 further includes a manual throttle input in the form of a throttle lever 184 shiftable between opposed adjustable stops 186, 188 adjustably secured to housing 140. Through an appropriate bearing 190 a shaft 192 extending within internal cavity 180 is rotatable relative to housing 140. Integrally carried by shaft 192 in an open-sided camming section 194 into which are pressed fit a pair of stub shafts 196 that respectively carry rollers 198. Rollers 198 are engageable with the lower shoulder of a spring stop 200 such that rotation of the throttle lever 184 and shaft 192 causes consequent rotation of stub shafts 196 which are non-aligned with the main rotational axis of shaft 192, and thus vertical shifting of spring stop 200 through rollers 198. During its vertical or longitudinal shifting, spring stop 200 is guided by a guide shaft 202 which has an upper guide roll pin 204 slidably extending through a central bore of spring stop 200. Guide rod 202 is threadably received and secured such as by lock nut 206 to housing 140.

Figure 19:
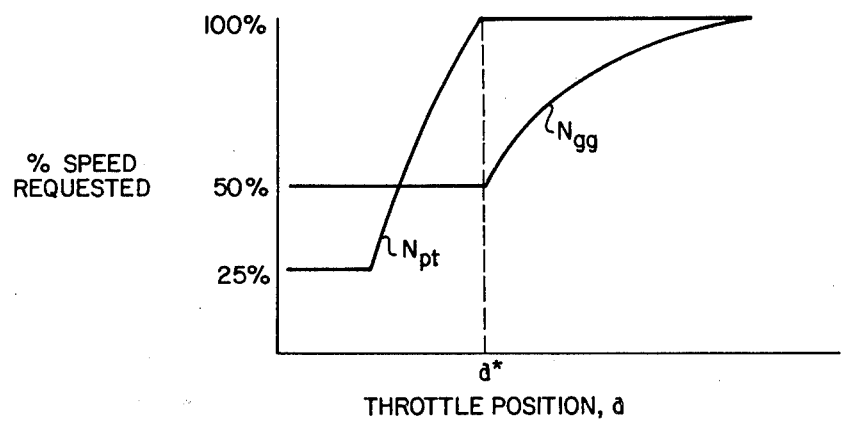
FIG. 19 is a graphical representation of the desired gas generator section and power turbine section speeds selected in relation to throttle position.

The governor 60 further includes a mechanical speed sensor which includes a flyweight carrier 208 rigidly secured to rotate with shaft 152. Rotating with carrier 208 are a plurality of regularly spaced flyweights 210 mounted for pivotal movement upon pins 212 securing the weights 210 to carrier 208. Dependent upon the speed of shaft 152, the centrifugal force causes rotation of weights 210 about pins 212 to cause the inner ends thereof to shift downwardly as viewed in FIG. 6 and drive the inner rotating race 214 of a roller bearing assembly also downwardly. Through ball bearings 216 this downward force is transmitted to the non-rotating outer race 218 of the bearing assembly to cause downward shifting of non-rotating segment 220. At its lower end segment 220 carries a spring stop shoulder 222, and a speeder spring 224 operably extends between the stop 222 of segment 220 and the spring stop 200 associated with the throttle input mechanism. Through a preload of spring 224 acting on segment 220 the flyweights are normally urged upward to the zero or low speed position illustrated in FIG. 6. Increasing speed of shaft 152 causes downward shifting of segment 220. Thus it will be apparent that throttle lever 184 acts essentially to select gas generator speed as reflected by the speed of shaft 152, since the compression of spring 224 is set by rotation of throttle lever 184 and then opposed by the centrifugal force created by the rotation of shaft 152. The vertical position of segment 220 therefore becomes indicative of the difference between selected speed (position of input throttle 184) and actual gas generator speed as sensed through flyweights 210. FIG. 19 illustrates the action of spring 224 in requesting different levels of gas generator speed $N_{gg}$, as the throttle is moved through different positions, a.

Governor 60 further includes a main fuel throttle lever 226 pivotally mounted by pin 228 to housing 140. One arm 230 of lever 226 terminates in a spherically shaped end 230 within a receiving groove 232 on segment 220 of the speed error signal mechanism. An opposite arm 234 of lever 226 is movable toward and away from metering orifice 178 in response to shifting of segment 220 to thereby variably meter fuel flow from passage 166 into internal cavity 180. It will be apparent that the regulating valve poppet 168 is variably positioned in response to the pressure differential between passage 168 and conduit 64 downstream of the metering orifice 178 to variably meter bypass fluid flow through passage 170 in order to maintain a substantially constant pressure differential across the fluid metering orifice created between metering opening 178 and the arm 234 of fuel lever 226. Thus the rate of fuel flow delivered from passage 166 to cavity 180 and output duct 144 is a function only substantially of the position of arm 234 relative to metering opening 178 whenever the latter is the fuel flow controlling parameter. As appropriate, a damping orifice 236 may be incorporated in pressure sensing line 182 to stabilize the movement of bypass valve poppet 168.

A uni-directional proportional solenoid 239 has an outer housing 238 integral with plate 176 or otherwise affixed in stationary relationship to housing 140. Disposed within the housing 238 is a coil 240, and a centrally arranged armature 242. Rigidly secured to form a portion of armature 242 is a central plunger shaft 244 which has an upper end engageable with lever arm 234. Linear gradient springs 246, 248 operably extend between stops on housing 238 to engage associated shoulders on the plunger shaft 244 to normally urge the latter to its de-energized position illustrated. Energization of the solenoid through appropriate electrical lead lines 250 causes upward shifting of the armature 242 and plunger shaft 244 so that the latter engages and exerts an upward force on lever arm 234 opposing and subtracting from the force exerted by speeder spring 224 upon lever 226.

While the plunger shaft 244 could, if desired directly engage the lever arm 234; in the preferred form a "floating face" arrangement for arm 234 is utilized. In this arrangement a floating flat poppet-type face 252 is carried within arm 234 in alignment with metering opening 178. This floating face is normally spring loaded toward the metering orifice, and the upper end of plunger shaft 244 is engageable therewith. The purpose of floating face 252 is to compensate for manufacturing tolerances and to assure that a relatively flat surface is directly aligned with metering opening 178 and lying perpendicular to the fluid flow therefrom to assure proper metering of fuel thereacross. The spring 254 loads floating face 252 toward opening 178. Pivoting of arm 234 against spring 254 to increase fuel flow is permitted until face 252 contacts the upper end of 245 of plunger 244. This stroking of arm 234 is quite limited but sufficient to create flow saturation of the annular orifice defined between opening 178 and face 252.

Figure 6:
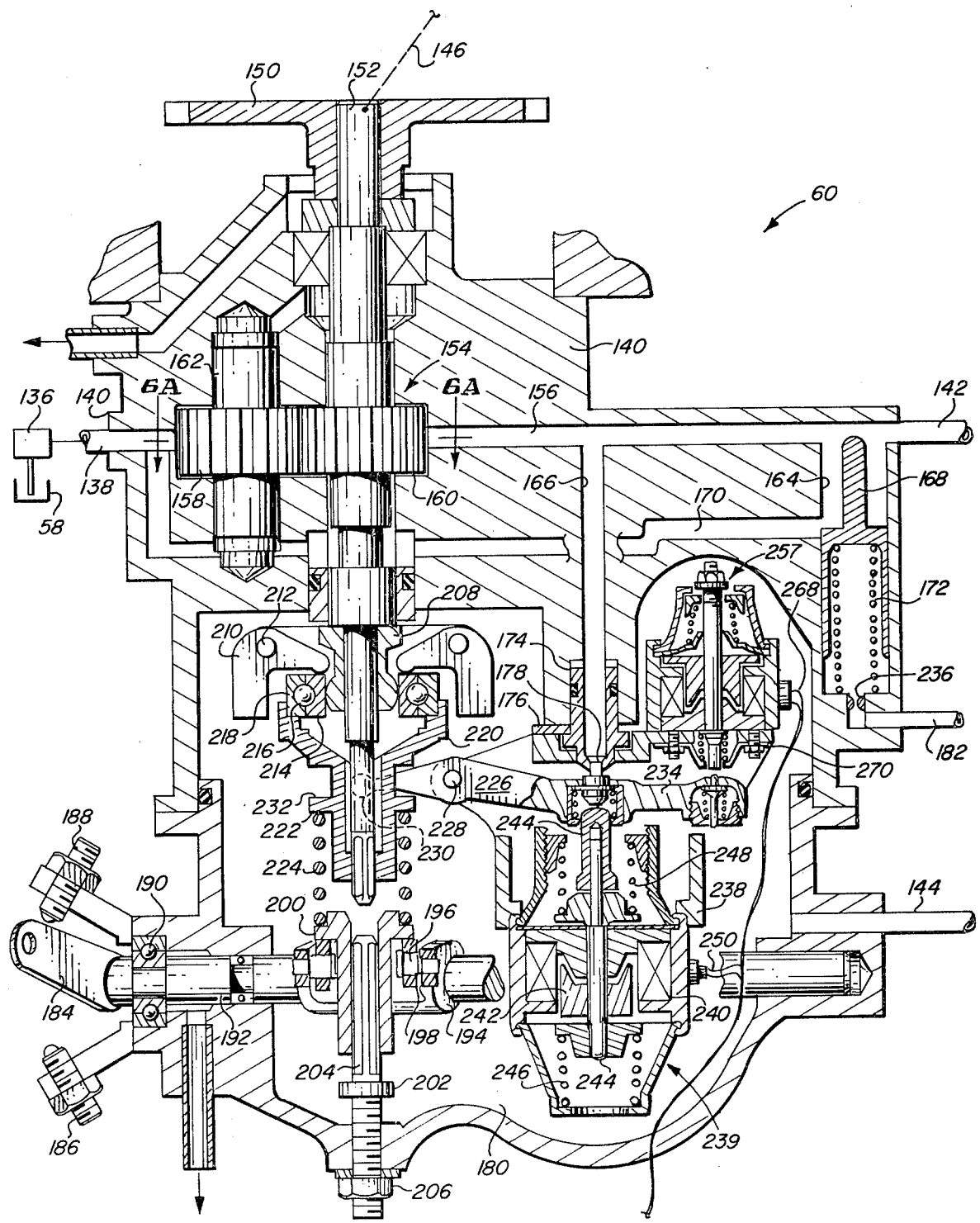
FIG. 6 is a partially schematic, plan cross-sectional view of the fuel governor 60 with portions shown perspectively for better clarity of operational interrelationships.
Figure 6B:
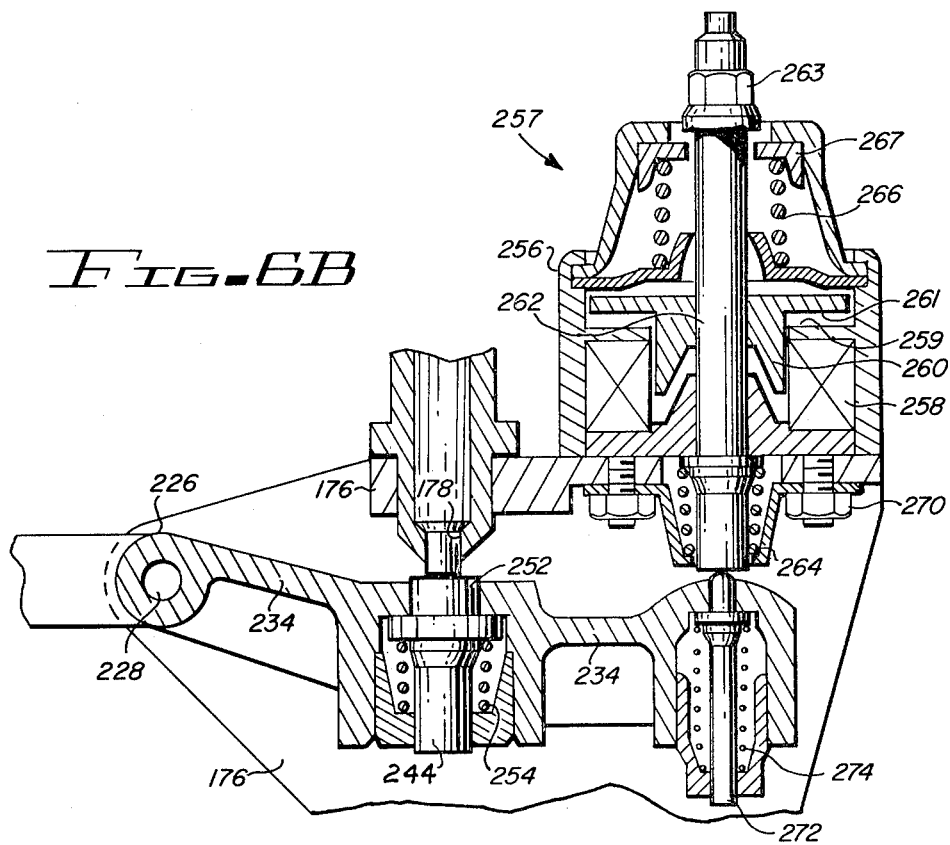
Figure 6C:
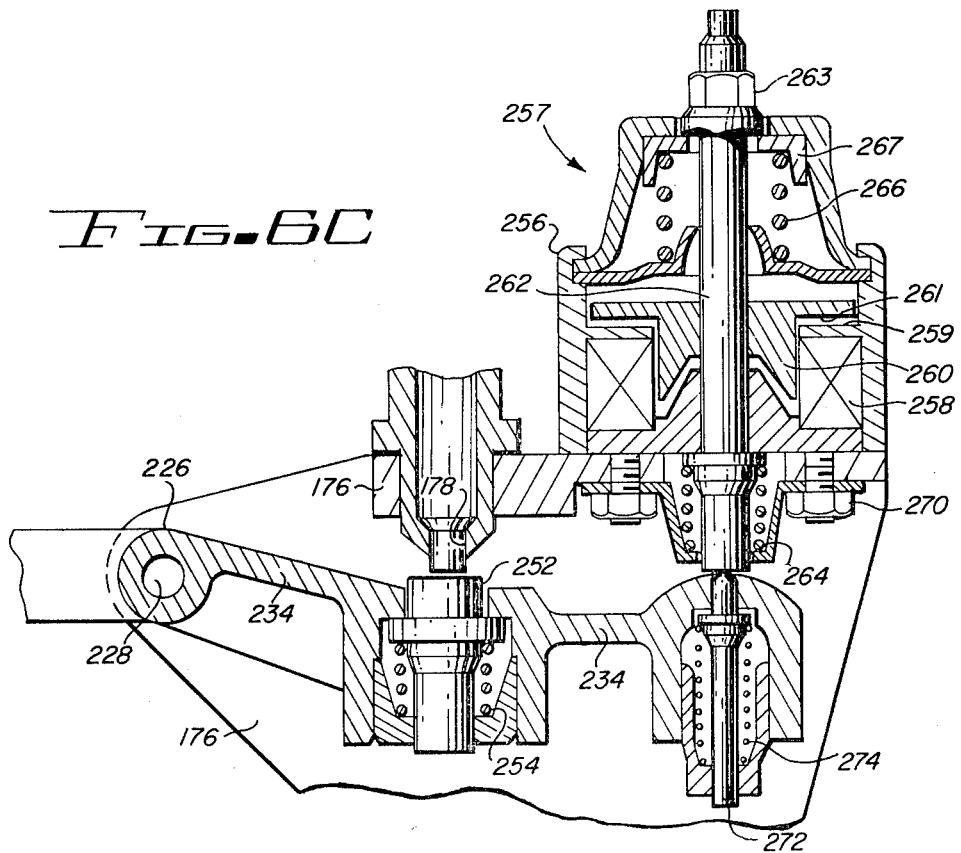
Figure 7:
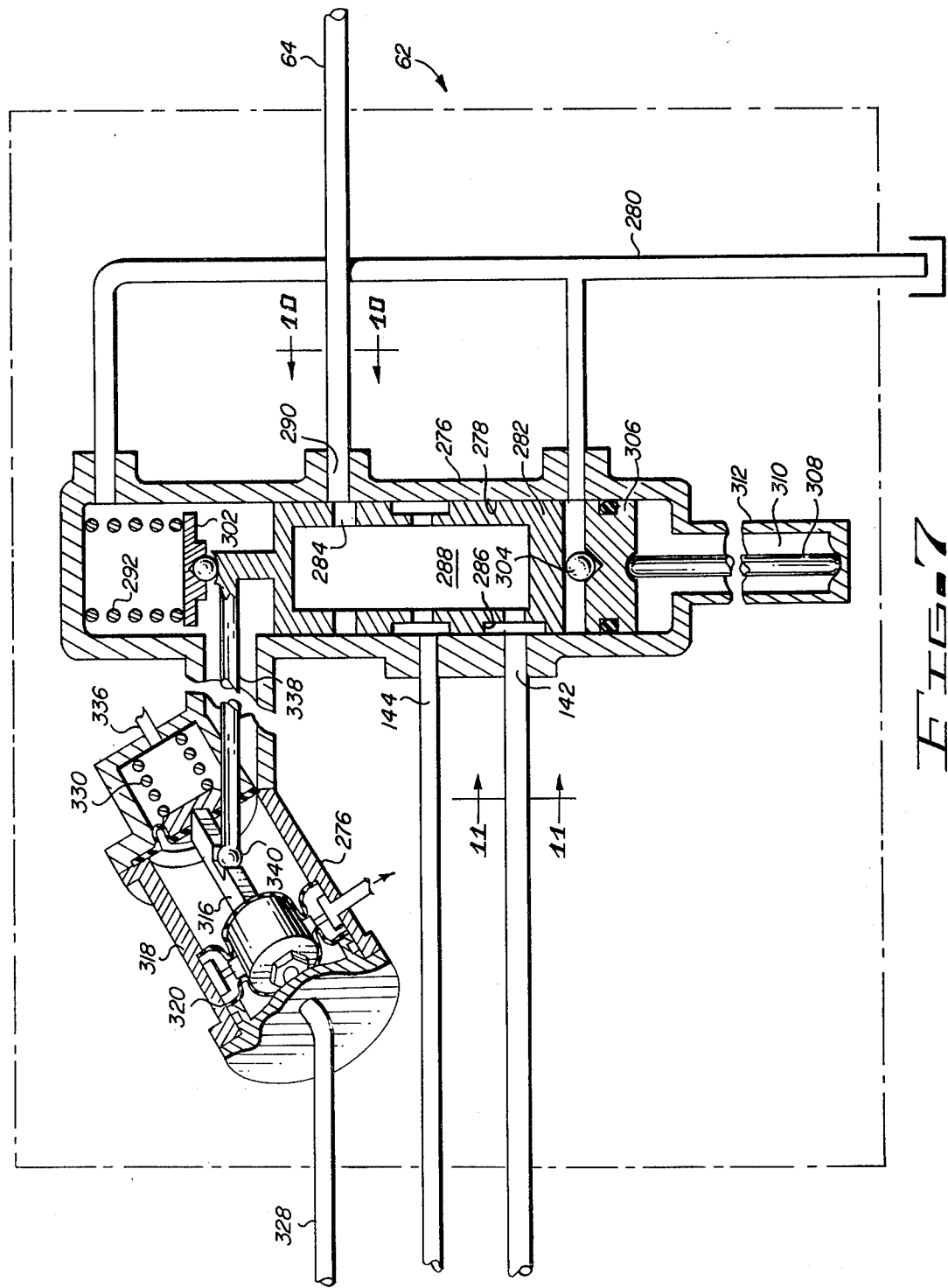
FIG. 7 is a schematic, cross-sectional and perspective functional representation of scheduling valve 62.

Disposed on the opposite side of lever arm 234 from solenoid 239 is a housing 256 of another directional, one-way solenoid 257 shown in FIGS. 6B–6D. Solenoid 257 includes a coil 258, armature 260, and plunger shaft 262 secured for movement therewith. Through appropriate stops, centering springs 264, 266 normally urge the plunger shaft 262 to the de-energized position illustrated. Upon energization of the coil 258 through appropriate leader lines 268, the armature 260 and plunger shaft 262 are shifted downwardly such that the plunger shaft engages the lever arm 234 in a manner exerting a force thereon tending to add to the force created by speeder spring 224 and rotating lever 226 to shift arm 234 away from opening 178. Housing 256 of solenoid 257 is rigidly secured such as by bolts 272 to securement plate 176. Similar to floating face 252, in the preferred form the plunger 262 does not directly engage the lever arm 234, but rather acts through a floating-type pin 272 to exert a force on arm 234. The pin 272 is pre-loaded by a spring 274 to give a floating action thereto in order to assure that plunger 262 can properly engage and exert a force on lever arm 234 regardless of variations in manufacturing tolerances, and/or the position of lever 226 relative to its pivotal shaft 228.

Both solenoids are urged to their de-energized position by linear gradient springs, and unlike on-off, digital-type solenoids, variation in current and/or voltage input to their coils will cause an analog incremental positioning of the plunger 244 of solenoid 239, and will move plunger 262 to either its FIG. 6-C or 6-D position.

The plunger 262 of solenoid 257 can be shifted away from its de-energized FIG. 6-B state, to two different energized states shown in FIGS. 6-C and 6-D. One electrical input signal of preselected, intermediate power causes the armature 262 to shift to the FIG. 6-C position, moving plunger 262 until the face of its adjustable stop nut 263 contacts the spring stop 267. This travel of plunger piston 262 depresses plunger 272 and compresses spring 274 to shift arm 234 away from opening 178 and increase fuel flow until gas generator speed increases to a level corresponding to the signal force generated by solenoid 257. Thus the plunger 272, spring 274 configuration assists in permitting a less-than-maximum power signal to produce a force of preselected magnitude on arm 234.

Another electrical input signal of greater power causes the armature to shift to the end of its stroke with face 261 thereof contact the adjacent stop face 259 of the housing 256 as shown in FIG. 6-D. This travel causes piston plunger 262 to compress centering spring 266 and cause its lower end to come into direct contact with arm 234 and urge the latter to permit maximum flow through the orifice presented between opening 178 and piston 252. As described in greater detail below, energization of solenoid 257 to its FIG. 6-D position is essentially a false throttle signal duplicating the speed desired from the gas generator when the throttle is depressed to its maximum fuel flow, maximum power position.

SCHEDULING VALVE 62

Referring now more particularly to FIGS. 7-11 scheduling valve 62 generally includes a housing 276 which may be integral with both housings 140 and the stationary engine housing 110. Preferably housing 276 is disposed in close proximity to both the fuel governor 60 and the combustor 98. Housing 276 includes an internal bore 278 into which open the two fuel ducts 142, 144 as well as the fuel line 64 and a low pressure return conduit 280 which returns fuel back to the source. Mounted for longitudinal sliding and rotation within bore 278 is a metering valve 282 having "windowed" irregularly shaped openings 284, 286 that open into the hollowed interior cavity 288 of valve 282. Fuel line 144 continuously communicates with interior cavity 288. Valve 282 further includes an opening 290 in continuous communication with fuel line 64. Deceleration window 286 is in general alignment with fuel duct 142, and acceleration window generally aligns with opening 290. The particular configuration of each of the windows 284, 286 is clearly illustrated in FIGS. 10 and 11.

Metering valve 282 is urged in one longitudinal direction by a biasing spring 292 which reacts against the housing 276 through a spring stop 294 acting on an alignment point 296 of a sealed block 298 mounted to housing 276 such as by snap ring 300. The preferred construction as illustrated in FIG. 9; however, the alignment point arrangement permitting rotation of valve 282 relative to housing 276 at the end of spring 292 may alternately be accomplished via a ball 302 configuration as shown schematically in FIG. 7. At the opposite end of valve 282 is a spherical ball 304 permitting rotation of valve 282 relative to a piston 306 carried in bore 278. Attached to housing 276 is a temperature sensitive element 312, 308, for example a thermally responsive cylinder, whose longitudinal length varies with respect to the temperature imposed thereon by the gas or other fluid in the temperature sensing chamber 310 within cylinder 312. The housing 276 is mounted relative to the engine such that a portion thereof, particularly cylinder 312 and the associated chamber 310 are in communication with and maintained at the same temperature, $T_{3.5}$, as the compressed air flow being delivered into the combustor. Thermally insulative material 311 is incorporated as necessary to avoid overheating of valve 62. For example the rightward end of FIG. 9 and the perforated cylindrical wall 312 may be disposed at the air inlet to the combustor and/or at the duct 96 carrying air from the recuperator 56 to combustor 98. In any case the scheduling valve is so arranged that cylinder 312 expands and contracts longitudinally with respect to increase and decrease of combustor inlet temperature. Valve 288 is operably engaged by the thermally responsive element 312 through a relatively non-thermally responsive ceramic rod 308. Accordingly, valve 288 is shifted longitudinally relative to input port 142 and opening 290 in relation to the sensed combustor inlet temperature. Thus the metering fuel flow accomplished by window 284 is varied in relation to the sensed combustor inlet temperature as this window moves longitudinally relative to opening 290.

Housing 276 further includes another transverse bore 314 which crosses and intersects generally with the longitudinal bore 276. Mounted for longitudinal reciprocation within this transverse bore 314 is a rod and piston configuration 316 which includes a pair of diaphragm-type seals 318, 320 having outer ends rigidly secured to housing 276 by being compressed between the housing, an intermediate section 322 and a closing plug 324 threadably or otherwise secured to housing 276. The inner ends of the seals 320 are secured on the movable piston, rod configuration 316. The seal 320 in conjunction with the end closing plug 324 define an interior pressure sensing chamber 326 to which one end of the piston 316 is exposed. Through a sensing line 328 the combustor pressure $P_{3.5}$ such as combustor inlet pressure is transmitted into chamber 326 to act upon one end of piston 316. At the opposite end of bore 314, a helical coil biasing spring means 330, grounded to housing 276 through a stationary stop 332, acts to urge the piston, rod configuration 316 in opposition to the pressure in chamber 326. The opposite end 334 of the piston configuration 316 is vented to atmospheric pressure through an appropriate port 336. A seal schematically shown at 335, which may be of a structure like seals 318, 320 and section 348, is also included at this opposite end 334. Thus gauge pressure in the combustor, i.e. the difference between ambient pressure and the absolute pressure maintained in combustor 98, acts upon piston 316 to shift the latter within bore 314.

An arm 338 is threadably secured within a transverse bore in metering valve 282 at one end, and at its other end the rod 338 has a spherical ball 340 mounted thereon which is received in a groove 342 in rod, piston 316. It will therefore be apparent that shifting of piston, rod 316 within bore 314 is translated into rotation of metering valve 282 about its major longitudinal axis. Accordingly, the respective openings between windows 284, 286 and the input ports 142 and opening 290 are also varied in relation to the magnitude of gauge pressure in compressor 98 by virtue of this rotational translation of metering valve 282. Groove 342 permits axial translation of arm 338 along with valve 282. While the rod, piston configuration 316 may be of varied arrangements, the preferred form as illustrated in FIG. 8 incorporates a threaded end section 344 which acts through appropriate spaces 346 to compress and secure the inner ends of seals 318, 320 to rod 316 through an intermediate section 348.

Thus, the scheduling valve acts as a mechanical analog computer in multiplying the parameters of combustor pressure, $P_{3.5}$ and combustor inlet temperature, $T_{3.5}$, such that the positioning of valve 282 and the windows 284, 286 is a function of the product quantity of combustor pressure multiplied by combustor inlet temperature.

Figure 4:
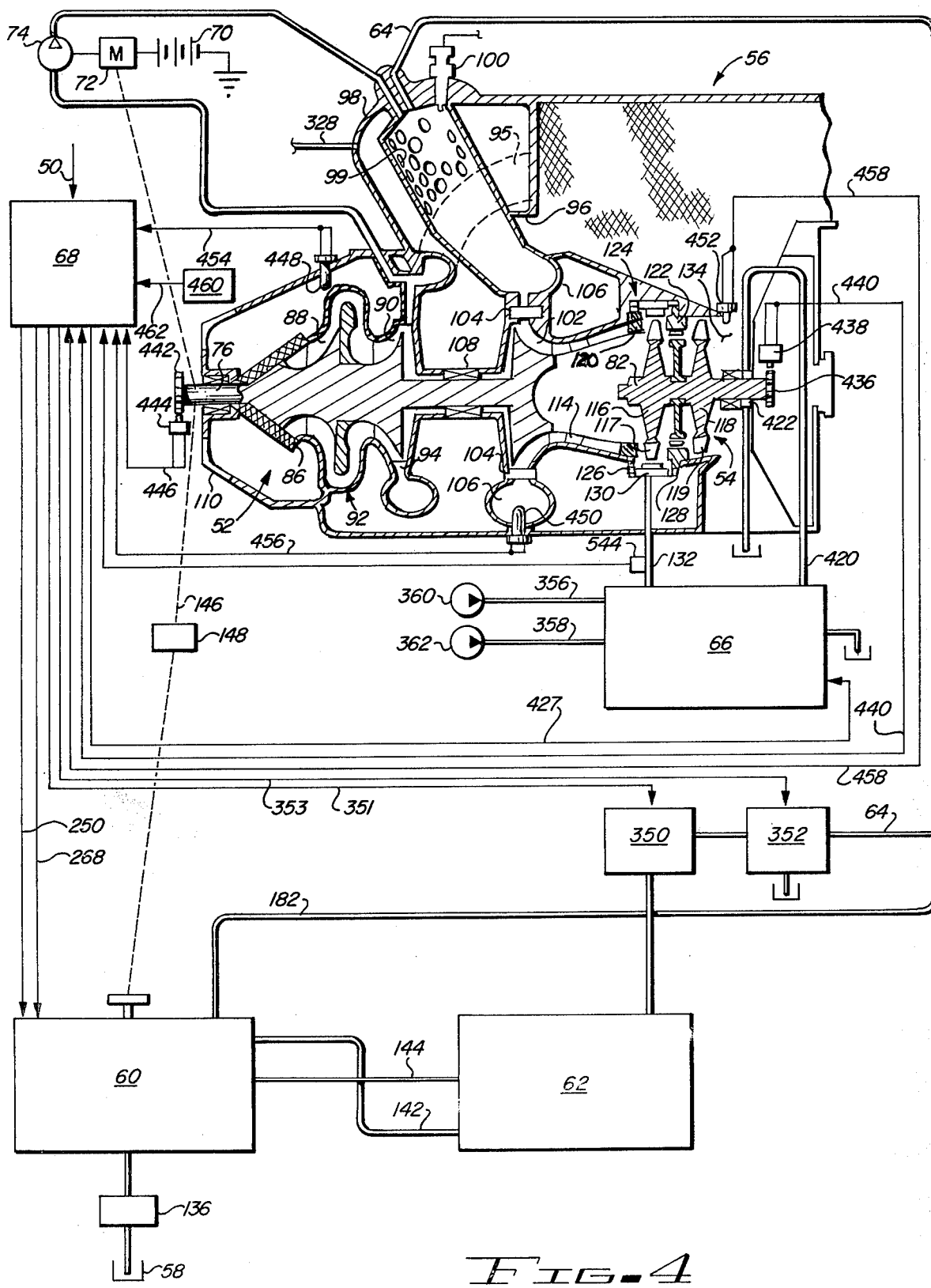
FIG. 4 is a partially schematic cross-sectional representation of the rotating group of the engine with controls associated therewith shown in schematic, block diagram form.

Conventionally, as shown in FIG. 4 the controls for engine 30 further includes a normally open, solenoid operated fuel sequencing solenoid valve 350 as well as a manually or electrical solenoid operated shut-off valve 352. These valves are disposed downstream of scheduling valve 62 and in the preferred form may be included within and/or adjacent to the housing 276 of scheduling valve 62.

The configuration of each of the windows 284, 286 as illustrated in FIGS. 8 and 9 are determined to solve a qualitative empirical formula of the following form:

$$W_f = (K_1 - K_2 T_{3.5}) P_{3.5} + K_3 T_{3.5}$$

where: $K_1$, $K_2$ and $K_3$ are constants determined by the operational characteristics of a particular gas turbine engine and are reflected by the configuration of window 284 and associated opening 290.

By proper formulation of the window 284 and opening 290, the solution to this equation as accomplished by scheduling valve 62 holds a constant maximum turbine inlet temperature $T_4$ during all or at least a portion of gas generator acceleration. Accordingly, when window 284 is the controlling parameter for fuel flow, scheduling valve 62 empirically by mechanical analog, controls fuel flow to maintain a substantially constant turbine inlet temperature, $T_4$. Window 284 is the primary operating parameter during acceleration of the engine as described in greater detail below. In contrast, window 286 is the controlling parameter during engine deceleration. While acceleration window 284 is contoured to maintain a substantially constant maximum gas generator turbine inlet temperature to provide maximum acceleration performance within the temperature limitations of the engine, the deceleration window 286 is contoured to limit and control fuel flow to prevent loss of combustion while affording substantial deceleration of the engine. An extensive discussion of operation of a similar type of turbine inlet temperature computing valve, but which utilizes absolute rather than gauge combustor pressure, may be found in United States Patent Application Ser. No. 689,339 of Rheinhold Werner, filed May 24, 1976, now U.S. Pat. No. 4,057,960.

VANE ACTUATOR 66

Figure 12:
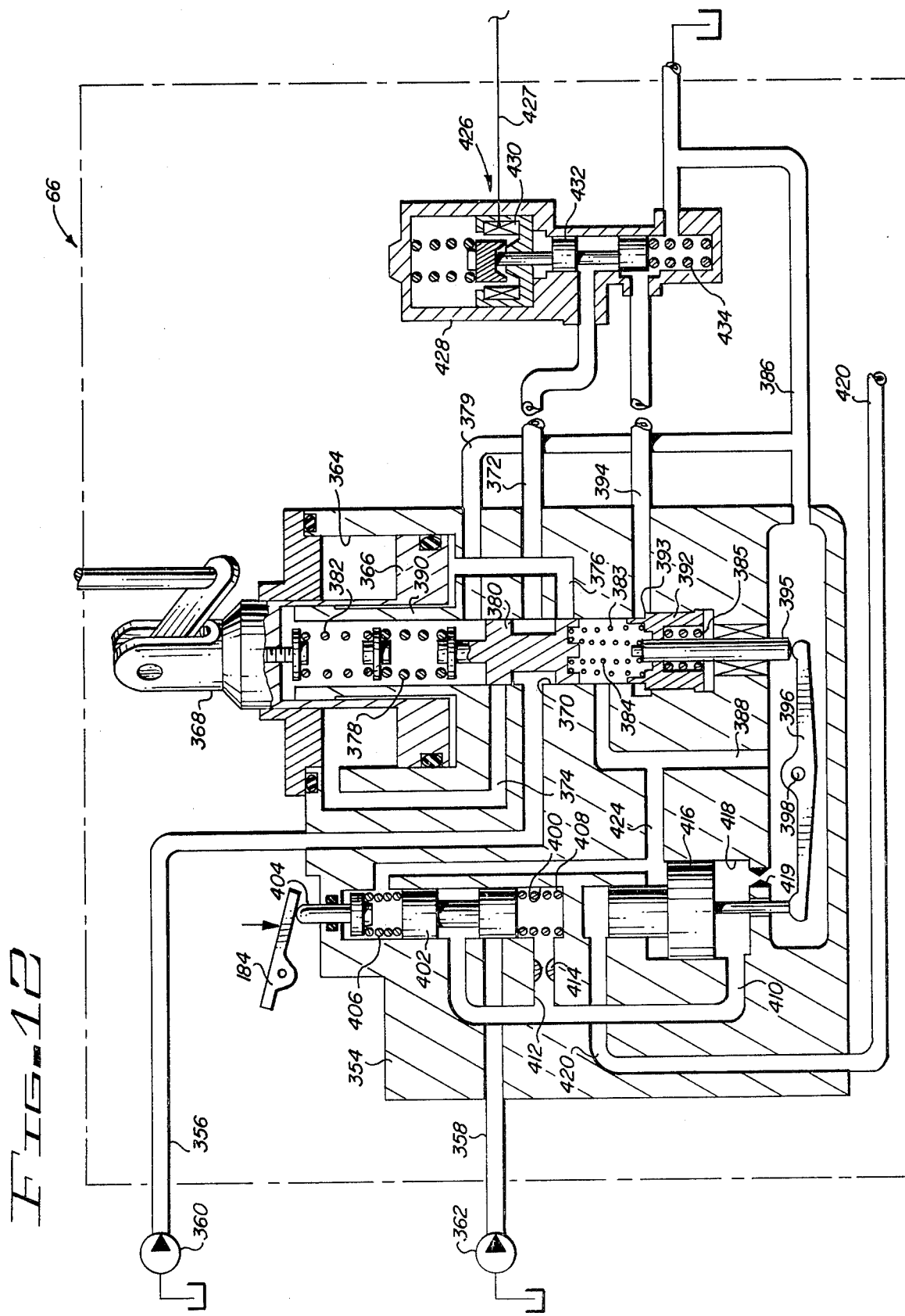
FIG. 12 is a schematic cross-sectional representation of guide vane control 66.

Details of the vane actuator control 66 are illustrated in FIGS. 12 and 13. The vane control is hydromechanical in nature and generally includes a housing 354 having a pair of hydraulic pressure fluid supply ports 356, 358 respectively receiving pressurized fluid from a high pressure pump source 360 and lower pressure pump source 362 each of which are driven through the auxiliary power system of the engine. It is understood that the pumps 360, 362 may provide various other functions within the engines also such as lubrication.

Housing 354 has an internal, fluid receiving cylinder 364 in which is reciprocally mounted a piston 366 dividing the cylinder into opposed fluid pressure chambers. Rod or shaft 368 carried with piston 366 extends exteriorly of housing 354 and is operably connected with the bell crank 130 of FIG. 13 so that, as described previously, linear reciprocation of rod 368 causes rotation of bell crank 130, ring gears 126, 128 and the sets of variable guide vanes 120, 122.

High pressure hydraulic fluid from inlet port 356 is delivered into a bore 370 within housing 354 located adjacent cylinder 364. Also intersecting at spaced locations along bore 370 are a high pressure fluid exhaust duct 372, and a pair of fluid work conduits 374, 376 respectively communicating with the cylinder 364 on opposed sides of piston 366. Mounted for reciprocation within bore 370 is a directional fluid control valve element 380 which is nominally positionable in the open center position illustrated wherein high pressure hydraulic fluid from duct 356 communicates only with the exhaust port 372. A series of centering springs 382, 383, 384, 385 normally urge valve 380 to the position shown. Valve 380 is of the four-way type and is shiftable one direction to direct high pressure fluid from port 356 to conduit 374 and the upper side of piston 366, while through conduit 376 the lower side of the cylinder carrying piston 366 is vented to a low pressure return 386 via bore 370, and communicating conduit 388. Valve 380 is shiftable in an opposite direction to direct pressure fluid from inlet 356 to conduit 376 and the lower side of piston 366, while conduit 374 communicates with return 386 through a chamber 378 and return line 379. It will be noted that piston 366 cooperates with housing 354, such as with a circular wall protrusion 390 thereof to prevent fluid communication between chamber 378 and cylinder 364.

Spring 382 acts to sense the position of piston 366 and the guide vane angle, and as a feedback device in acting upon valve 380. The relative compression rates of spring 382 in comparison to the springs 383–385 provides a high gain response requiring large movement of piston 366 (e.g. 14 times) to counteract as initial movement of valve 380 and return the valve to its center position. Thus it will be apparent that piston 366 acts in servo-type following movement to the movement of an "input piston" in the form of valve 380.

In bore 370 is a stepped diameter piston mechanism 392 shiftable in response to the magnitude of fluid pressure from a conduit 394 acting upon a shoulder 393 of piston 392. Piston 392 presents an adjustable stop for varying the compressive force of spring 383. Pressure acting on shoulder 393 is opposed by a spring 385. Slidably extending through the center of element 392 is a rod 395 which acts as a variably positionable stop upon the spring 384 extending between the upper end of rod 395 and valve 380. Rod 395 is longitudinally shiftable in response to rotation of a fulcrum type lever 396 pivotally mounted to housing 354 at pivot 398.

Vane actuator control 66 further includes another bore 400 in which is mounted a control pressure throttling valve 402. An input from the throttle lever 184 of the engine acts to depress a variably positionable spring stop 404 to increase the force exerted by compression spring 406 in urging valve 402 downwardly. Opposing spring 406 is a gradient compression, helical coil spring 408. Valve 402 is variably positionable to meter hydraulic flow from port 358 to conduit 410. It will be noted that conduit 410 also communicates with the lower end of throttling valve 402 via a conduit 412 having a damping orifice 414 therein. Conduit 410 leads to the larger face of a stepped piston 416 reciprocally mounted within another bore 418 in housing 354. One end on bore 418 is in restricted fluid communication with return 387 through an orifice 419. The smaller diameter section of stepped piston 416 receives pressurized fluid from conduit 420. Through an appropriate exhaust conduit 424 the intermediate section of the stepped piston, as well as the upper end of valve 402 are exhausted to low pressure return 386 through the conduit 388.

Conduit 420 provides a hydraulic signal indicative of the speed of the power turbine shaft 82. In this connection, the vane actuator includes a non-positive displacement type hydraulic pump, such as a centrifugal pump 422 mounted to and rotated by power turbine shaft 82. Being a non-positive displacement type pump, the pump 422 delivers pressurized hydraulic flow through conduit 420 such that the pressure maintained on the smaller diameter of stepped piston 416 is a square function of the speed of power turbine shaft 82. Similarly, the action of throttling valve 402 develops a pressure on the large diameter of piston 416 in relation to a desired or selected speed reflected by the position of the throttle 184.

The valve 402 and piston 416 act as input signal means and as a comparator to vary the compressive force of spring 384 as a function of the difference or error between actual power turbine speed and the power turbine speed requested by throttle position. The requested $N_{pt}$ is graphically illustrated in FIG. 19.

The vane actuator control 66 further includes a linear, proportional solenoid actuator 426 operably connected by electrical connector lines 427 to electronic control module 68. Actuator 426 includes a housing 428 enclosing a coil 430, and a centrally arranged armature which carries therewith a hydraulic directional control valve 432. Valve 432 is normally urged upwardly by spring 434 to the position communicating conduit 394 with return 386. Valve 432 is proportionally shiftable downwardly in response to the magnitude of the energization signal to proportionally increase communication between conduits 372 and 394 while decreasing communication between conduit 394 and drain. As a result, pressure in conduit 394 increases proportionately to the magnitude of the electronic signal, such pressure being essentially zero in the absence of an energization signal to solenoid 426. It will be noted that minimum pressure in conduit 394 allows springs 383 and 385 to exert maximum upward force on valve 380, and that increasing pressure in conduit 394 shifts piston 392 downwardly to reduce the force exerted by springs 383, 385 upon valve 380, thus developing an override force in the form of reduced force from spring 383.

In the absence of an electrical signal to solenoid 426 minimum pressure is exerted on shoulder 393 causing the guide vanes to be controlled by power turbine speed. Thus, the guide vanes during start-up are at their FIG. 14 position and at other conditions of engine operation are normally urged to maximum power, FIG. 15 position.

Figure 18:
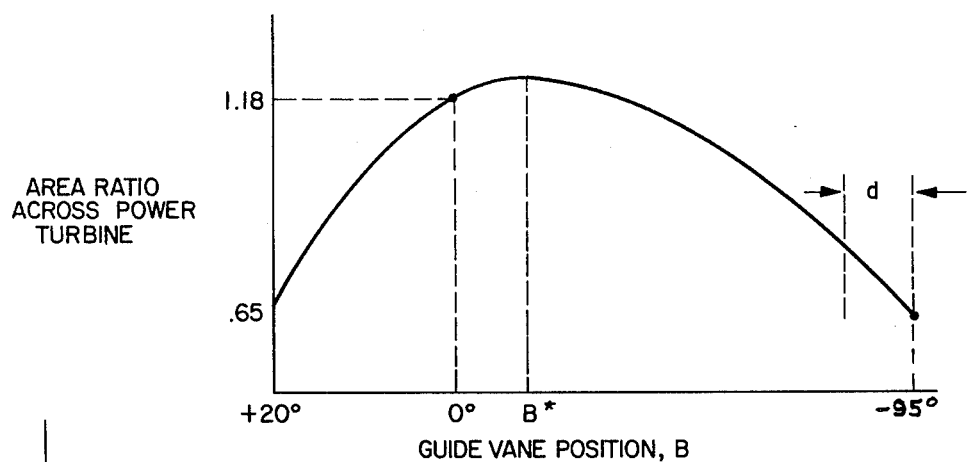
FIG. 18 is a graphical representation of the area ratio across the power turbines as a function of guide vane angle.

As shown in FIG. 18, vane actuator 66 is operable to vary guide vane angle, B, from 0° to +20° to alter the positive incidence of gas flow upon the power turbine blades and thus alter power transmitted from the gas flow to rotate the power turbine wheels in a direction transmitting motive power to the vehicle. The vane actuator 66 is also operable to shift the guide vanes to a negative incidence position and modulate the guide vane position with zone "d" of FIG. 18. In these negative incidence positions, gas flow is directed to oppose and thus tend to decelerate the rotation of the power turbine wheels.

ELECTRONIC CONTROL 68

Figure 17:
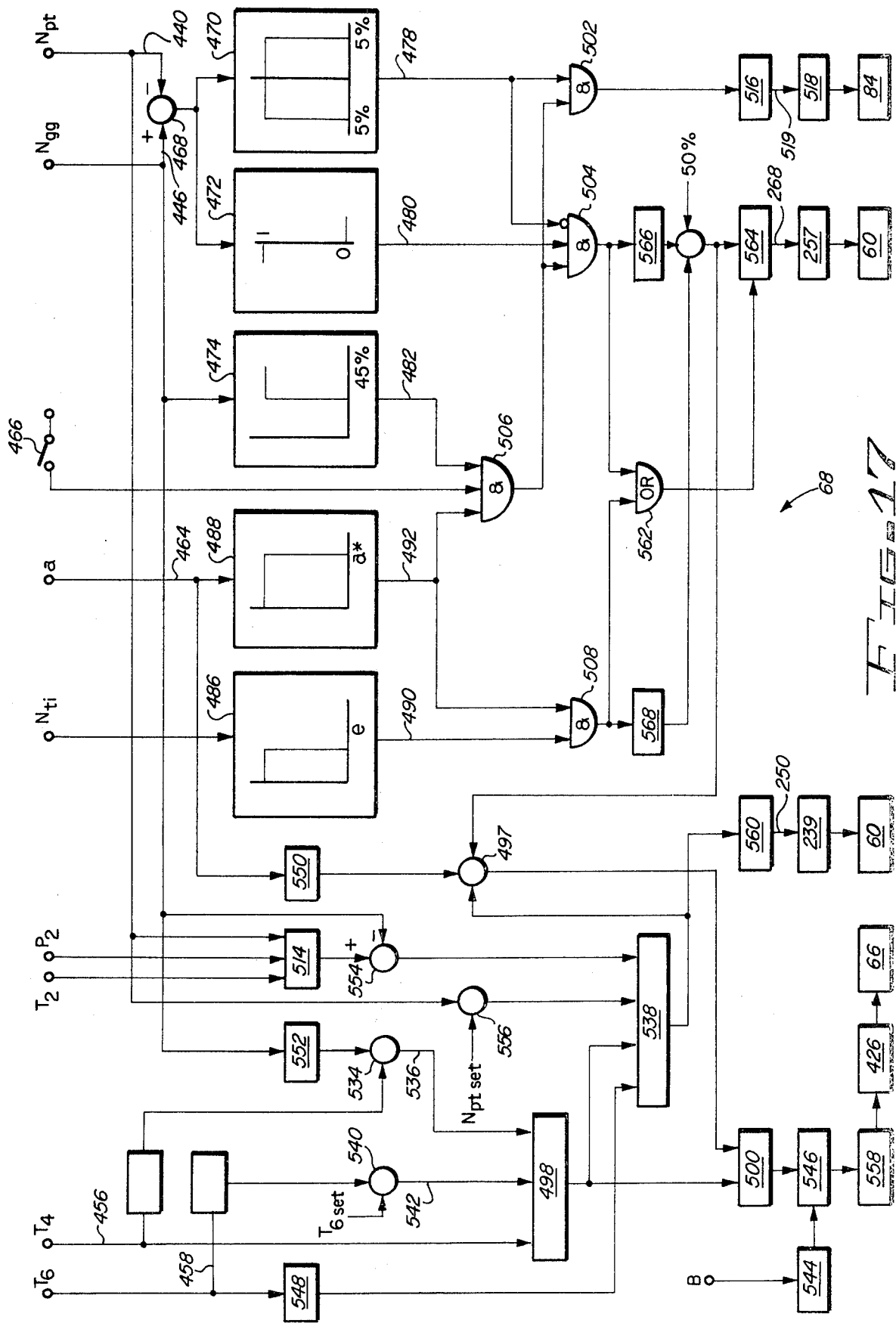
FIG. 17 is a schematic logic representation of a portion of the electronic control module 68.

A portion of the control logic of the electronic control module 68 is illustrated in FIG. 17. The electronic control module receives input electrical signals indicative of power turbine speed ($N_{pt}$) through a chopper 436 secured to power turbine shaft 82 and an appropriate magnetic monopole 438 which transmits an electronic signal indicative of power turbine speed through lead line 440. Similarly, gas generator speed, $N_{gg}$, is sensed through a chopper 442, monopole 444 and lead lines 446. Transducers 448, 450, and 452 respectively generate electrical input signals indicative of the respective temperature sensed thereby, i.e. compressor inlet temperature $T_2$, turbine inlet temperature $T_4$, and turbine exhaust temperature $T_6$. As illustrated these temperature signals are transmitted through lines 454, 456 and 458. The electronic control module also receives from an ambient pressure sensor 460 and associated line 462 an electrical signal indicative of ambient pressure $P_2$. The electronic control module further receives from an appropriate sensing device an electrical signal through lines 464 indicative of throttle 184 position, "a." Also, a switch 466 is manually settable by the vehicle operator when power feedback braking (described more in greater detail below) is desired. A transducer 544 generates a signal to an inverter 546 whenever the variable guide vanes are moved past a predetermined position B*.

The electronic control module includes several output signals to energize and/or de-energize the various logic solenoids and relays including solenoid 518 through line 519, solenoid 257 through line 268, fuel sequencing solenoid 350 through associated line 351, fuel trim solenoid 239 through line 250, and the vane solenoid 426 through line 427. The electronic control module includes function generators 514, 550 and 552. Box 514 is denoted as a "flat rating and torque limiting" function and generates a signal indicative of maximum allowable gas generator speed as a function of ambient conditions $T_2$ and $P_2$ and power turbine speed $N_{pt}$. Element 550 transforms the throttle position signal "a" into an electronic gas generator speed request signal, and function generator 552 produces a signal as a function of gas generator speed $N_{gg}$ from line 446. The module further includes comparators 497, 534, 540, 554, 556 as well as the logical elements 498, 500 and 538. The logical elements are of the "lowest wins" type, i.e. they pass the algebraically lowest input signal.

The logic element 498 selects from the signals 536 and 542 which have been generated in comparators 534 and 540 indicating the amount of over or undertemperature for $T_4$ and $T_6$. An additional input from 456 is provided to logic element 498 so as to provide an indication of excessive $T_4$ figures in the case of a failed $T_4$ sensor signal. The logic element 500 receives inputs from 497 and 498. Comparator 497 compares the electronic speed request with the actual gas generator speed 446 to determine if the engine has been requested to accelerate or is in steady state. The output of logic element 500 is fed to inverter 546, generating an appropriate signal in solenoid driver 558 which then moves trim solenoid 426 a distance proportional to the magnitude of signal 427.

The logic element 538 receives its inputs from comparators 554 and 556, logic element 498 and a differentiator 548. As noted, logical element 498 indicates the lower of the two temperature errors $T_4$ and $T_6$. The output of comparator 556 is the error between the operator requested power turbine speed $N_{pt}$ and the actual power turbine speed $N_{pt}$. The output of comparator 554 is indicative of the difference between the maximum allowable gas generator speed determined by function generator 514 and the actual gas generator speed 446. The logic element 538 selects the algebraically lowest signal and outputs it to solenoid driver 560 with an output on line 250 which is passed on to the governor reset decrease solenoid 239 in the fuel control 60.

As depicted in FIG. 17, the electronic control module includes a comparator 468 and synthesizers of function generators 470, 472 and 474. Function generator 470 produces an output signal in line 478 indicative of whether the difference between power turbine speed and gas generator speed is less than a preselected maximum such as five percent. Function generator 472 produces a signal in line 480 showing whether or not power turbine speed is greater than gas generator speed, while function generator 474 generates a signal in lines 482 showing whether or not gas generator speed is greater than 45 percent of its maximum speed. The control logic further includes function generator 486 and 488 which respectively generate signals in associated line 490 and 492 showing whether or not transmission input speed is above a preselected minimum "e" and whether throttle position is below a preselected throttle position a*. Throttle position "a" is obtained from a suitable position sensor such as a variable resistance potentiometer. Thus, output signal 464 is indicative of throttle position "a."

The electronic control module further includes the logical gates 502, 504, 506, 508 and 562. Logical AND gate 502 receives inputs from line 478 and AND gate 506 to produce an output signal to solenoid driver 516 to activate power feedback clutch 84. Logical AND gate 506 receives its inputs from line 482, switch 466 and line 492 and produces an input signal to AND gates 502 and 504. Logical AND gate 504 receives an input from line 480 and the inverted input from line 478. Its output generates a 50% gas generator speed signal and also enables solenoid driver 564 through OR gate 562 to produce the "a" signal in line 268 which is the result of a constant 50% signal plus the output of element 566. Signal 268 then activates the governor reset increase solenoid 257 in the fuel control 60. Logical AND gate 508 receives its inputs from lines 490 and 492. Its output signal generates a 20% gas generator signal through function generator 568 which, added to the constant 50% signal by summer 570 results in a fast idle signal (70% gas generator speed) to the governor reset increase solenoid 257. The output of AND gate 508 also generates the enable signal to solenoid driver 564.

POWER FEEDBACK CLUTCH 84

While various forms of clutches could be utilized for power feedback clutch 84, the preferred form shown in FIG. 3 comprises a "wet" type hydraulically actuated clutch which includes a shaft 520 from the gear train 78 associated with gas generator shaft 76, and a shaft 522 interconnected with the gear train 80 associated with the power turbine output shaft 82. The clutch operates in a continual bath of lubricating cooling fluid. The gas generator shaft 520 drives a plurality of discs 524, which are interposed in discs 526 connected to the output shaft 522. The clutch actuator is in a form of a solenoided operated directional hydraulic control valve 518 which, in the energized position illustrated, ports pressurized fluid such as from source 362 into a fluid pressure chamber 528 to urge piston 530 against the urgings of a return spring 532 to force the plates 524, 526 into interengagement such that the power from shaft 522 may be fed back to gas generator shaft 520 to assist in braking. When the solenoid actuator 518 is de-energized, the chamber 528 is exhausted to a low pressure drain to permit the spring 532 to shift piston 530 away from the position shown and disengage the plates 524, 526.

OPERATION

Starting

In a conventional manner start motor 72 is electrically energized to initiate rotation of gas generator drive shaft 76 and the input shaft 152 of fuel governor 60. The control module 68 energizes the normally open fuel sequence solenoid 350, and solenoid 352 is also in an open position to clear fuel line 64 for delivery to the combustor. As necessary, an assist pneumatic pump 74 delivers pressurized air into combustor 98 along with the action of ignition plugs 100. Motor 72 is utilized to drive the various components described until the gas generator section reaches its self-sustaining speed, normally in the range of approximately 40% of maximum rated gas generator speed.

During initial rotation and starting of the engine, the low speed of rotation of fuel governor drive shaft 152 cannot overcome the bias of speeder spring 224, and thus fuel lever 226 is disposed away from and clearing orifice 178 to permit fuel flow from line 166 to output line 144. Also during this initial starting, the combustor temperature ($T_{3.5}$) and combustor pressure ($P_{3.5}$) are both relatively low such that scheduling valve 62 also permits significant fuel flow through line 64 to the combustor.

LOW IDLE

As gas generator shaft 76 speed climbs beyond the self-sustaining speed, start motor 72 is shut off and the combustion process permits self-sustaining operation of the gas generator. Speeder spring 224 is normally set to maintain a low idle value of approximately 50% of maximum gas generator rated speed. Accordingly, the mechanical flyweight governor operates in opposition to speeder spring 224 to adjust fuel lever 226 and maintain fuel flow through orifice 178 to hold gas generator speed at a nominal 50% of maximum. This 50% low idle speed is effective whenever proportional solenoid 257 is in the de-energized state illustrated in FIG. 6.

The electronic control module 68 normally maintains solenoid 257 in the de-energized state to select the low idle gas generator speed whenever the transmission input shaft speed of shaft 36, as sensed by speed sensor 48, is rotating. Such normally occurs whenever the clutch 34 is engaged with transmission 38 in its neutral position, or whenever the vehicle is moving regardless of whether or not the clutch 34 is engaged or disengaged. Accordingly, during idling when not anticipating acceleration of the engine, the comparator 486 of the electronic control module 68 notes that the speed of shaft 36 is above a pre-determined minimum, "e", such that no signal is transmitted from comparator 486 to AND gate 508. Solenoid 257 remains de-energized, and the gas generator speed is controlled by the governor to approximately 50% its maximum speed.

HIGH IDLE

Maximum power is normally required to be developed from an engine driving a ground vehicle upon initiating acceleration of the vehicle from a stationary or substantially stationary start. As a natural consequence of normal engine operator action upon starting from a stationary start, transmission input shaft 36 comes to a zero or very low rotational speed as clutch 34 is disengaged while gear shift lever 46 is articulated to shift the transmission into gear. Once the speed of shaft 36 drops below a predetermined speed, "e", comparator 486 of the electronic control module generates an output signal to AND gate 508. Since accelerator lever 184 is still at its idle position, the sensor associated with line 464 generates a signal to energize comparator 488 and also send a positive signal to AND gate 508. The output of AND gate 508 energizes function generator 568 to add 20% to the constant idle command of 50%, so that summer 570 provides a 70% command signal to solenoid driver 564 that has been abled through the output of AND gate 508 and OR gate 562. Accordingly, solenoid 257 is energized by an appropriate current signal through line 268 to shift to its FIG. 6C position. In this position the solenoid 257 has been sufficiently energized to drive shaft 262 and plunger 272 downwardly as viewed in FIG. 6C and exert a force on fuel lever 226 tending to rotate the latter away from and increase the size of orifice 178. The additional force exerted by solenoid 257 is sufficient to increase fuel flow through orifice 178 to increase gas generator speed to a predetermined higher level, such as 70% of maximum gas generator speed. The flyweight governor operates to hold the gas generator speed constant at this level.

In this manner, the idle speed of the gas generator section is reset to a higher value in anticipation of a required acceleration such that more power will be instantly available for accelerating the vehicle. At the same time, when acceleration is not anticipated, as determined by whether or not transmission input shaft 36 is rotating or stationary, the electronic control module 68 is operable to de-energize solenoid 257 and reduce gas generator speed to a lower idle value just above that necessary to maintain a self-sustaining operation of the gas generator section. In this manner power necessary for acceleration is available when needed; however during other idling operations the fuel flow and thus fuel consumption of the engine is maintained at a substantially lower value. This is accomplished by producing a signal, minimum speed of shaft 36, which is anticipatory of a later signal (rotation of accelerator lever 184) requesting significant increase in power transmitted to drive the vehicle.

ACCELERATION

Acceleration of the gas turbine engine is manually selected by depressing the accelerator 184. To fuel governor 60 this generates a gas generator section speed error signal in that the depression of lever 184 rotates shaft 192 to increase compression of speeder spring 224 beyond that force being generated by the mechanical flyweight speed sensor. Fuel lever 226 rotates in a direction substantially clearing the opening 178 to increase fuel flow to the combustor.

At the same time, depression of throttle lever 184 generates a power turbine section speed error signal to vane actuator control 66. More particularly, depression of throttle 184 compresses spring 406 to shift valve 402 downwardly and increase the pressure maintained in chamber 418 substantially beyond that being generated by the hydraulic speed signal generator of pressure developed by pump 422 and exerted on the other side of the step piston 416. Accordingly, lever 396 is rotated generally clockwise about its pivot 398 in FIG. 12, allowing downward retraction, if necessary, of plunger 395 and reduction of compression on spring 384.

Summer 497 of the electronic control module determines a large disparity between accelerator position and gas generator speed to develop an electronic signal to element 500 overriding other signals thereto and reducing the signal in line 427 to zero to de-energize the solenoid 426 of guide vane control 66. The spring bias urges plunger 430 and valve 432 to the position shown in FIG. 12 to minimize hydraulic pressure developed in conduit 394 and exerted on piston shoulder 393. As discussed above in the vane control 66 description, springs 382-385 position valve 380 to cause following movement of piston 366 to its nominal or "neutral" position. In this position vane piston 366 and rod 368, the guide vanes 120 are disposed in their FIG. 14 position wherein the gas flow from the combustor is directed onto the power turbine vanes in a manner minimizing power transfer to the power turbine vanes. More particularly, the guide vanes 120 are disposed in their FIG. 14 position to reduce the pressure drop or pressure ratio across turbine blades 117 to a minimum value, this position corresponding to the 0° position of FIG. 18.

Since the nozzles 104 maintain the combustor 98 in a choked condition, this reduction in pressure ratio across the turbine blades 117 creates a substantial increase in pressure ratio across the radial inflow turbine 102 of the gas generator section. Accordingly positioning of the guide vanes in their FIG. 14 position by allowing the springs 382-385 to position valve 380 and piston 366 in its "neutral" position, alters the power split between the gas generator turbine 102 and the power turbines 116, 118 such that a preselected maximum portion of power from the motive gas flow is transmitted to the gas generator turbine 102. As a result, maximum acceleration of the gas generator section from either its low or high idle setting toward its maximum speed is achieved. As noted previously, the requirement for impending acceleration has been sensed, and the engine is normally already at its high idle setting so that gas generator speed promptly nears its maximum value.

As gas generator speed increases, the combustor pressure $P_{3.5}$ accordingly increases. This causes rotation of the metering valve 282 of the fuel schedule control 62 to increase the amount of overlap between acceleration schedule window 284 and opening 298 in the fuel scheduling valve. Increase in this opening causes a consequent increase in fuel flow to combustor 98 and an ultimate resulting increase in the inlet temperature $T_{3.5}$ through the actions of recuperator 56.

To the operation of engine 30, increase in $T_{3.5}$ is in practical effect the same as a further fuel flow increase. Accordingly, in solving the above described equation the window 284 shifts to reduce fuel flow with increasing $T_{3.5}$ to produce an "effective" fuel flow, i.e. one combining the effects of actual fuel flow and inlet temperature $T_{3.5}$, at the sensed gauge pressure $P_{3.5}$ to produce a desired combustor exhaust or gas generator turbine inlet temperature $T_4$.

This increase in fuel flow created by the rotation of valve 282 and as compensated by axial translation of the valve provides an "effective" fuel flow that increases power developed and transmitted from the gas flow to gas generator turbine 102. This then causes another increase in gas generator speed, and combustor pressure $P_{3.5}$ again increases. Scheduling valve thus acts in regenerative fashion to further accelerate the gas generator section. As noted previously, the scheduling valve is so contoured to satisfy the equation discussed previously and allow continued increase in $P_{3.5}$ while maintaining combustor outlet temperature $T_4$ at a relatively constant, high value. In this manner the gas generator section is accelerated most rapidly and at maximum efficiency since the turbine inlet temperature $T_4$ is maintained at a high, constant value.

While the acceleration window 284 and opening 290 may be relatively arranged and configured to maintain a constant $T_4$ throughout acceleration, a preferred form contemplates maintaining a substantially constant $T_4$ once the power turbine has initiated rotation, while limiting turbine outlet or recuperator inlet temperature during a first part of the acceleration operation. In this manner excessive $T_6$ is avoided when the power turbine section is at or near stall. More specifically, it will be noted that upon starting acceleration of the vehicle, the free power turbine section 54 and its shaft 82 are stationary or rotating at a very low speed due to the inertia of the vehicle. Thus there is little temperature drop in the gas flow while flowing through the power turbine section, and the recuperator inlet temperature $T_6$ starts approaching the temperature of gas flow exiting the gas generator radial turbine 102. If combustor exhaust or gas generator turbine inlet temperature $T_4$ is maintained at its maximum constant value at this time, it is possible that $T_6$ may become excessively high in instances of high inertial load which lengthens the time of this substantial "stall" condition on the power turbine section. Of course, as the power turbine section overcomes the inertia and reaches higher speeds, temperature drop across the power turbines increases to hold down recuperator inlet temperature $T_6$.

For such free turbine type engines, relatively complicated and expense controls, electronic and/or mechanical, are normally expected in order to avoid excessive $T_6$ while providing responsive acceleration under the conditions in question. An important discovery of the present invention, as embodied in scheduling valve 62, is in providing an extremely simple, economical, mechanical structure capable of limiting $T_6$ during the critical turbine section stall period but yet still promoting very responsive engine acceleration. At the same time this improved arrangement has eliminated the need for compensation for substantial variations in ambient pressure and thus the need to compensate for the variations in altitude that would be expected to be encountered by a ground vehicle. In this connection it would be expected that absolute combustor pressure $P_{3.5}$ must be the parameter in solving the equation described previously such that the scheduling valve could reliably compute the turbine inlet temperature $T_4$ created by a particular combination of combustor pressure, $P_{3.5}$, and inlet temperature, $T_{3.5}$.

However, a discovery of the present invention is that by proper selection of the constants $K_1$, $K_2$ as embodied in the size and configuration of openings 284, 290, and by utilization of combustor gauge pressure rather than combustor absolute pressure, mechanically simple and economical structure with minimum control complexity can accomplish the desired control of both $T_6$ and $T_4$ during acceleration. Window 284 and opening 290 are relatively arranged such that valve 282 rotates to a minimum $P_{3.5}$, a slight overlap remains between the window and opening. Thus, a minimum fuel flow, $W_f$, is maintained at this condition which is a function of $T_{3.5}$ since valve 282 is still capable of translating axially. This gives rise to the third term, $K_3 T_{3.5}$, in the equation set forth above and dictates an initial condition of fuel flow when window 284 becomes the controlling fuel flow parameter upon starting acceleration.

The constants $K_1$, $K_2$ are chosen, their actual values being determined by the aerodynamic and thermodynamic characteristics of the engine, such that at a preselected value, $P_{3.5}*$, intermediate the maximum and minimum values thereof, the acceleration window controls fuel flow to maintain a constant $T_4$. At combustor pressures below this preselected value, the acceleration window provides fuel flow allowing $T_4$ to reduce below the preselected maximum desired level therefor. It has been found that an inherent function of using gauge combustor pressure rather then absolute pressure, in combination with these chosen values of $K_1$, $K_2$ and a preselected minimum fuel flow at minimum $P_{3.5}$ as determined by $K_3$, is that fuel flow is controlled by the acceleration window to prevent recuperator inlet temperature $T_6$ from exceeding a preselected value. This approach still utilizes the simple geometry of window 284 and 290, both rectangles, that mechanically compute the product of $T_{3.5}$ multiplied by $P_{3.5}$. Accordingly, at pressures lower than $P_{3.5}*$ which are characteristic of the conditions under which the turbine section "stalling" occurs, the utilization of gauge combustor pressure prevents potentially damaging excessive $T_6$. The design point for window 284 is, of course, the condition of maximum vehicle inertia experienced on turbine shaft 82, lesser values of such inertia naturally permitting more rapid turbine shaft speed increase and less time in the "stalling" condition above described.

Figure 20:
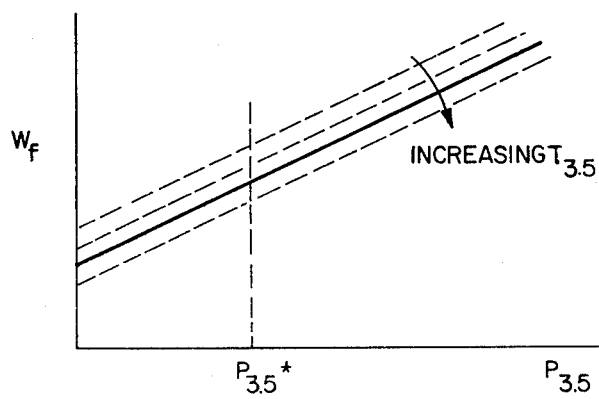
FIG. 20 is a graphical representation of the relationship of fuel flow permitted by the scheduling valve as a function of combustor pressure along lines of constant combustor inlet temperature.

From inspection of the equation solved by valve 282 it will be apparent that fuel flow $W_f$ is a linear or straight line function of $P_{3.5}$ as shown in FIG. 20, with a slope determined by $K_1$ and $K_2$, an intercept specified by $K_3$, and passing through the point producing the preselected turbine inlet temperature $T_4$ at the selected intermediate value $P_{3.5}*$. Of course, a family of such straight line curves of $W_f$ vs. $P_{3.5}$ results for different values of $T_{3.5}$ While, if desired, curve fitting of window 284 and opening 290 could be utilized to maintain $T_4$ at precisely the same value at pressures at and above the preselected intermediate $P_{3.5}*$, in the preferred form compound curvature of the window and opening is not utilized. Instead, the window and opening are of rectangular configuration thus permitting $T_4$ to increase very slightly at combustor pressures above $P_{3.5}*$. However, it has been found that such arrangement affords an excellent, practical approximation to the theoretically desired precisely constant $T_4$, resulting in practical effect in maintaining a substantially constant $T_4$ at a desired maximum value once combustor gauge pressure exceeds the preselected level $P_{3.5}*$. Accordingly, the present invention inherently limits recuperator temperature $T_6$ to solve the problem of recuperator overheating when starting to accelerate a high inertial load, yet still maintains a maximum $T_4$ for high engine efficiency throughout the remainder of acceleration once the inertia is substantially overcome and for the majority of time during acceleration. At the same time, and contrary to what might normally be expected, it has been found that the need for altitude compensation is obviated since there exists a minimum fuel flow at minimum combustor pressure, which minimum fuel flow varies linearly with combustor inlet temperature $T_{3.5}$. Thus the present invention provides a simple mechanical solution to the interdependent and complex problems of limiting two different temperatures $T_4$, $T_6$ for different purposes, i.e. avoiding recuperator overheating while affording high engine operating efficiency and thus highly responsive acceleration.

As the gas generator continues to accelerate, the flyweight governor 208 of the fuel governor 60 begins exerting greater downward force to counteract the bias of speeder spring 224. Accordingly, the fuel lever 226 begins rotating in a generally counter-clockwise direction in FIG. 6 to begin metering fuel flow through opening 178. Once the opening 178 becomes smaller than that afforded by metering window 284 in schedulding valve 62, the operation of the scheduling valve is overridden and the fuel governor 60 begins controlling fuel flow to the combustor in a manner trimming gas generator speed to match the speed selected by the rotation of the shaft 192 associated with the acceleration lever 184 in the fuel governor 60.

Similarly, this increase in gas generator speed is sensed in the electronic control module 68 by summer 497 such that once gas generator speed $N_{gg}$ approaches that selected by the position of the accelerator pedal as sensed electronically through line 464, the override signal generated by summer 497 is cut off. In response, element 500 is allowed to generate a signal energizing the proportional solenoid 426 of the guide vane control 66. Valve 432 associated with solenoid 426 is shifted to increase pressure exerted upon piston shoulder 393 to permit the piston 366 and the guide vanes to shift from the FIG. 14 disposition thereof towards the FIG. 15 position. This shifting of the guide vanes from the FIG. 14 to the FIG. 15 position again alters the work split between the gas generator turbine 102 and the power output turbines 116, 118 such that greater power is developed across the output turbines and transmitted to output shaft 82 while a lesser portion is transmitted to turbine 102.

Thus it will be apparent that acceleration of the engine and vehicle occurs by first altering the work split so that maximum power is developed across the gas generator turbine 102, then increasing fuel flow along a preselected schedule to regeneratively further increase power developed across the gas generator while maintaining turbine combustor exhaust temperature $T_4$ at a substantially constant, preselected maximum. Once substantial acceleration of the gas generator section has been accomplished, the guide vanes are then rotated to alter the power or work split so as to develop a greater pressure ratio across and transmit more power to the power turbine 116, 118 and the power output shaft 82.

Cruise

During normal cruise operation (i.e. traveling along at a relatively constant speed or power output level) the guide vane control 66 acts primarily to alter the work split between the gas generator turbine 102 and the power output turbines 116, 118 so as to maintain a substantially constant combustor exhaust temperature $T_4$. This is accomplished by the electronic control module which includes a summer 534 developing an output signal in line 536 to the logic box 498 indicative of the difference between the actual and desired turbine inlet temperature $T_4$. More particularly, solenoid 426, as discussed previously, is maintained normally energized to generate maximum pressure upon the piston shoulder 393 of the guide vane actuator. For instance, assuming that $T_4$ is above the preselected desired value thereof, a signal is generated to line 536 and element 498 to reduce the magnitude of the electric signal through line 427 to solenoid 426. Accordingly, the spring bias 434 of the solenoid begins urging valve 432 in a direction reducing fluid communication between conduits 372 and 394 while correspondingly increasing communication between conduit 394 and exhaust conduit 386. The reduction in pressure exerted upon piston 393 accordingly allows spring 385 to increase the spring bias of spring 383 to cause upward travel of valve 380 and corresponding downward travel of piston 366 to drive the vanes backwards from their FIG. 13 disposition ($+20°$ position of FIG. 18) toward a wider open position increasing the area ratio and reducing the pressure ratio across the vanes of the turbines 116, 118. Accordingly, in response to $T_4$ over-temperature, the guide vanes are slightly opened up to reduce the pressure ratio across the turbine 116, 118. In response the increased pressure ratio across gas generator turbine 102 causes an increase in gas generator speed. Such increase in gas generator speed is then sensed by the flyweight governor 208 of the fuel governor 60 to cause counter-clockwise rotation of fuel lever 226 and reduce fuel flow through opening 178. The reduction in fuel to the combustor 98 accordingly reduces the combustor exhaust or turbine inlet temperature $T_4$ toward the preselected value thereof. Thus, the guide vane control operates to adjust the guide vanes as necessary and causes a consequent adjustment in fuel flow by the fuel governor 60 due to change in gas generator speed $N_{gg}$ so as to maintain the combustor exhaust temperature $T_4$ at the preselected, maximum value. It will be apparent also from the foregoing that reduction in turbine inlet temperature $T_4$ below the preselected desired value thereof causes a corresponding movement of the guide vanes 120, 122 to increase the pressure ratio across the power turbine 116, 118. Accordingly this causes a reduction in pressure ratio across gas generator turbine 102 to reduce gas generator speed. In response the fuel governor shifts fuel lever 226 in a clockwise rotation as viewed in FIG. 6 to increase fuel flow to the combustor and thus increase turbine inlet temperature $T_4$ back to the desired value. It will be apparent that the change in guide vane position also directly alters the combustor exhaust temperature $T_4$ due to the difference in air flow therefrom; however, the major alteration of combustor exhaust temperature is effected by altering the fuel flow thereto as described above.

During the cruise operation therefore, it should now be apparent that fuel governor 60 acts to adjust fuel flow in such a manner as to maintain a gas generator speed in relation to the position of the accelerator lever 184. Clearly, the fuel governor 60 operates in conjunction with or independently of the vane control 66, dependent only upon the gas generator speed $N_{gg}$.

While the electronic control module operates the guide vane control solenoid 426 to trim turbine inlet temperature $T_4$ during cruise, the hydromechanical portion of the guide vane control 66 acts in a more direct feedback loop to trim the speed of power turbine output shaft 82. More particularly, the actual power turbine speed as sensed by the pressure developed in line 420 is continuously compared to the accelerator lever position as reflected by the pressure developed in line 410. A graphical repesentation of the action of valve 402 and piston 416 in compressing spring 384 and requesting different desired power turbine speeds $N_{pt}$ in relation to the throttle position, a, is shown in FIG. 19. Thus, in response to an increase in speed of power turbine shaft 82 beyond that selected by the rotation of accelerator lever 184, pressure at the lower diameter of piston 416 becomes substantially greater than that on the larger face thereof to rotate lever 396 so as to increase compression of the biasing spring 384 acting on valve 380. The resulting upward movement of valve 380 causes a corresponding downward movement of piston 366 and accordingly shifts the guide vanes toward the FIG. 14 position, i.e. opens the guide vanes to increase the area ratio and reduce the pressure ratio across the vanes 117, 119 of the two power turbine wheels. This reduces the power transmitted from the gas flow to the power turbine wheel and thus causes a slight decrease in power turbine output shaft speed back to that selected by the accelerator lever 184. It will be apparent that whenever the speed of the power turbine shaft 82 is below that selected by accelerator lever 184, the compression of spring 384 is reduced to tend to increase the pressure ratio across the power turbine vanes 117, 119 to tend to increase power turbine speed $N_{pt}$.

The portion of vane control 66 for trimming power turbine speed in relation to accelerator position is preferably primarily digital in action since as shown in FIG. 19, a small change in throttle lever position increases the requested $N_{pt}$ from 25% to 100%. The actions of valve 402, piston 416 and plunger 395 are such that when the accelerator is at a position greater than a*, this portion of the control continually requests approximately 105% power turbine speed $N_{pt}$. Through a small amount of rotation of the accelerator below a*, the control provides a request of power turbine speed proportional to the accelerator position. Positioning of the accelerator to an angle below this small arc causes the control to request only approximately 25% of maximum $N_{pt}$.

Thus, in normal cruise the guide vanes control operates in conjunction with the fuel governor to maintain a substantially constant turbine exhaust temperature $T_4$; fuel governor 60 operates to trim gas generator speed $N_{gg}$ to a value selected by the accelerator lever 184; and the hydromechanical portion of guide vane 66 operates to trim power turbine outpt speed $N_{pt}$ to a level in relation to the position of accelerator pedal 184. It will further be apparent that during the cruise mode of operation, the orifice created at opening 178 of the fuel governor is substantially smaller than the openings to fuel flow provided in the scheduling valve 62 so that the scheduling valve 62 normally does not enter into the control of the engine in this phase.

Safety Override

During the cruise or other operating modes of the engine discussed herein, several safety overrides are continually operable. For instance solenoid 239 of the fuel governor 60 operates to essentially reduce or counteract the effect of speeder spring 224 and cause a consequent reduction in fuel flow from orifice 178 by exerting a force on fuel lever 226 tending to rotate the latter in a counter-clockwise direction in FIG. 6. As illustrated in FIG. 17, the electronic control module includes a logic element 538 which is responsive to power turbine speed $N_{pt}$, gas generator speed $N_{gg}$, turbine inlet temperature $T_4$, and turbine exhaust or recuperator inlet temperature $T_6$. Thus if turbine inlet temperature $T_4$ exceeds the preselected maximum, a proportional electrical signal is transmitted to lines 250 to energize solenoid 239 and reduce fuel flow to the engine. Similarly, excessive turbine exhaust temperature $T_6$ results in proportionately energizing the solenoid 239 to reduce fuel flow to the combustor and thus ultimately reduce turbine exhaust temperature $T_6$. Also, logic element 438 is responsive to power turbine speed so as to proportionately energize solenoid 239 whenever power turbine speed exceeds a preselected maximum. Similarly, the electronic control module operates to energize solenoid 239 whenever gas generator speed exceeds a preselected maximum established by function generator 514 as a function of $P_2$, $T_2$ and $N_{pt}$. Normally the preselected maximum parameter values discussed with regard to these safety override operations, are slightly above the normal operating values of the parameters so that the solenoid 239 is normally inoperable except in instances of one of these parameters substantially exceeding the desired value thereof. Thus, for instance, during a cruise mode of operation or "coasting" when the vehicle is traveling downhill being deiven to a certain extent by its own inertia, the solenoid 239 is operable in response to increase of power turbine output shaft 82 beyond that desired to cut back on fuel flow to the combustor to tend to control the power turbine output speed.

While as discussed previously with regard to the cruise operation of the vehicle, the guide vane control normally is responsive to combustor exhaust temperature $T_4$ as reflected in the signal generator by element 435, the logic element 498 is also responsive to the turbine exhaust temperature $T_6$ in comparison to a preselected maximum thereof as determined by summer 540 which generates a signal through line 542 to element 498 whenever turbine exhaust temperature $T_6$ exceeds the preselected maximum. Logic element 498 is responsive to signal from either line 542 or 536 to reduce the magnitude of the electronic signal supplied through line 427 to solenoid 426 and thus reduce the pressure ratio across the turbine wheels 116, 118. As discussed previously, this change in pressure ratio tends to increase gas generator speed and in response the fuel governor 60 reduces fuel flow to the combustor so that turbine exhaust temperature $T_6$ is prevented from increasing beyond a preselected maximum limit.

As desired, the solenoid 239 may be energized in response to other override parameters. For instance, to protect the recuperator 56 from excessive thermal stresses, the logic element 538 may incorporate a differentiator 548 associated with the signal from the turbine exhaust temperature $T_6$ so as to generate a signal indicative of rate of change of turbine exhaust temperature $T_6$. Logic element 438 can thus generator a signal energizing solenoid 239 whenever the rate of change of turbine exhaust temperature $T_6$ exceeds a preselected maximum. In this manner solenoid 239 can control maximum rate of change of temperature in the recuperator and thus the thermal stress imposed thereon. Similarly, the logic element 538 may operate to limit maximum horsepower developed across the power turbine and/or gas generator shafts.

Gear Shift

Because turbine engine 30 is of the free turbine type with a power output shaft 82 not physically connected to the gas generator shaft 76, the power turbine shaft 82 would normally tend to greatly overspeed during a gear shifting operation wherein upon disengagement of the drive clutch 34 to permit gear shifting in box 38, substantially all inertial retarding loads are removed from the power turbine drive shaft 82 and associated power shaft 32. Of course, during normal manual operation upon gear shifting, the accelerator lever 184 is released so that the fuel governor 60 immediately begins substantially reducing fuel flow to combustor 98. Yet because of the high rotational inertia of the power turbine shaft 82 as well as the high volumetric gas flow thereacross from the combustor, the power turbine shaft would still tend to over speed.

Accordingly, the control system as contemplated by the present invention utilizes the guide vane actuator control 66 to shift the guide vanes 120, 122 toward their FIGS. 16 "reverse" position such that the gas flow from the engine impinges oppositely on the vanes 117, 119 of the power turbine in a manner opposing rotation of these power turbine wheels. Thus the gas flow from the engine is used to decelerate, rather than power, the turbine shaft 82. As a result, the power turbine shaft tends to reduce in speed to the point where synchronous shifting of gear box 38 and consequent re-engagement of drive clutch 36 may be conveniently and speedily accomplished without damage to the engine or drive train.

More particularly, the hydromechanical portion of guide vane control 66 is so arranged that upon release of accelerator lever 184 such as during gear shifting, a very large error signal is created by the high pressure from the power turbine speed sensor line 420 to rotate lever 396 counter-clockwise and substantially greatly increase the compression of spring 384. Sufficient compression of spring 394 results to urge valve 380 upwardly and drive piston 366 downwardly to its position illustrated in FIG. 12. This position of piston 366 corresponds to positioning the guide vanes 120, 122 in their FIG. 16 disposition. The gas flow from the combustor is then directed by the guide vane across the turbine wheel vanes 117, 119 in opposition to the rotation thereof to decelerate the power turbine shaft 82. Since the drive clutch 34 is disengaged during this gear shifting operation, the power turbine shaft 82 rather rapidly decelerates by virtue of the opposing gas flow created by the positioning of guide vanes 120 in their FIG. 16 position. Yet more specifically, the arrangement of springs 406, 408 and the relative magnitude of pressure developed in conduit 410 and 420 causes the hydromechanical portion of vane actuator control 66 to operate in the manner above described to shift the guide vanes 120 to their negative or reverse disposition illustrated in FIG. 16 and modulate guide vane position within zone "d" of FIG. 18 in relation to the magnitude of $N_{pt}$ excess, whenever the accelerator lever 184 is moved to less than a preselected accelerator lever position a*. As the speed of power turbine shaft 82 reduces, the piston 416 begins shifting in an opposite direction to reduce compression of spring 384 once turbine speed reduces to a preselected value. The action of piston 416 is in the preferred form capable of modulating the degree of compression of spring 384 in relation to the magnitude of the $N_{pt}$ error. The greater the speed error, the more the guide vanes are rotated to a "harder" braking position. Thus, the position of the guide vanes are maintained in a reverse braking mode and are modulated through zone "d" near the maximum braking position −95° of FIG. 18 in relation to the power turbine speed error. Once gear shifting is completed, of course, the control system operates through the acceleration operation discussed previously to again increase power turbine speed.

DECELERATION

A first mode of deceleration of the gas turbine engine is accomplished by reduction in fuel flow along the deceleration schedule afforded by deceleration window 286 of scheduling valve 62. More particularly, the release of accelerator lever 184 causes the fuel governor 60 to severly restrict fuel flow through opening 178. As a consequence the minimum fuel flow to the gas turbine engine is provided through deceleration fuel line 142 and the associated deceleration window 286 of the scheduling valve. As noted previously deceleration window 286 is particularly configured to the gas turbine engine so as to continually reduce fuel flow along a schedule which maintains combustion in the combustor 98, i.e., substantially along the operating line of the gas turbine engine to maintain combustion but below the "required to run line." As noted previously, even without rotation of accelerator lever 184, the solenoid 239 can be energized in particular instances to generate a false accelerator lever signal to fuel lever 226 to accomplish deceleration by severely restricting fuel flow.

This deceleration by limiting fuel flow is accomplished by reducing the accelerator lever to a position at or just above a preselected accelerator position, a*. This accelerator position is normally just slightly above the minimum accelerator position, and generally corresponds to the position of the accelerator lever during the "coasting" condition wherein the engine is somewhat driven by the inertia of the vehicle such as when coasting downhill. Since this deceleration by restricting fuel flow is acting only through governor 60, it will be apparent that the guide vane control is unaffected thereby and continues operating in the modes and conditions discussed previously. This is particularly true since the accelerator has been brought down to, but not below the preselected accelerator position a* to which the hydromechanical portion of vane actuator 66 is responsive.

Upon further rotating accelerator lever 184 below the position a* and towards its minimum position, a second mode of deceleration or braking of the vehicle occurs. In this mode, the movement of the accelerator lever below the position a* causes the hydromechanical portion of guide vane actuator 66 to generate a substantially large error signal with regard to power turbine speed so as to rotate the guide vanes 120 to their FIG. 16 reverse or "braking" position. More particularly, as discussed above with regard to the gear shift operation of the vehicle, this large error signal of the power turbine speed in comparison to the accelerator lever position causes significant counter-clockwise rotation of lever 396 and consequent compression of spring 384. This drives the piston 366 and the guide vanes toward the FIG. 16 position thereof. As a result, the gas flow from the gas turbine engine opposes rotation of the turbine wheels 116, 118 and produces substantial tendency for deceleration of output shaft 82. It has been found that for a gas turbine engine in the 450 to 600 horsepower class, that this reversing of the guide vanes in combination with minimum fuel flow to the combustor as premitted by deceleration window 286 provides on the order of 200 or more horsepower braking onto the turbine output shaft 82.

It will be noted that during this second mode of deceleration, as well as during the gear shift operation discussed previously, that since the guide vanes are now in a reversed disposition, the logic accomplished by the electronic control module 68 in controlling solenoid 426 to prevent over temperature of $T_4$ or $T_6$ is now opposite to that required. Accordingly, the electronic control logic further includes a transducer 544 which senses whenever the guide vanes pass over center as noted by the predetermined angle $B^*$ of FIG. 18, and are in a negative incidence disposition. This signal generated by transducer 544 energizes a reversing device such as an inverter 546 which reverses the signal to the solenoid 426. More particularly, if during this deceleration operation with the guide vanes in the negative incidence position of FIG. 16, there occurs an excess combustor exhaust temperature $T_4$ or excess turbine exhaust temperature $T_6$, the signal generated by element 500 to reduce the magnitude of the current signal is reversed by element 546. Accordingly occurrence high $T_4$ or high $T_6$ while element 546 is energized generated an electrical signal of increasing strength to solenoid 426. In response, the solenoid 426 drives valve 432 in a direction increasing pressure in conduit 394 and upon shoulder 393. This reduces the magnitude of the biasing spring 383 and causes valve 380 to move downwardly. In a following movement the piston 366 moves upwardly to reduce the compression of spring 382. Thus the guide vanes 120 are reversely trimmed away from the maximum braking position shown in FIG. 16 back towards the neutral position of FIG. 14. This movement of course reduces the magnitude of power transmitted from the gas flow in opposing rotation of the guide vanes 117 to cause a consequent reduction in fuel flow as discussed previously. The reduced fuel flow then reduces the magnitude of the over temperature parameter $T_4$ or $T_6$. Such action to control $T_4$ or $T_6$ will substantially only occur when fuel flow being delivered to the combustor is more than permitted by the deceleration schedule 286. Thus such action is more likely to occur during the "coasting" operation than during hard braking during the second mode of deceleration. Such is natural with operation of the engine, however, since during hard deceleration, fuel flow to the combustor is at a minimum and combustor exhaust temperature is relatively low. However, during unusual conditions, and even with the guide vanes in a negative incidence position, the electronic control module is still operable to return the guide vanes toward their neutral position to tend to reduce any over temperature conditions.

POWER FEEDBACK BRAKING

A third mode of deceleration of the vehicle can be manually selected by the operator. Such will normally occur when, after initiation of the first two modes of deceleration described above, the vehicle still is being driven by its own inertia at too high a speed, i.e. power turbine shaft 82 speed $N_{pt}$ is still too high. Thus power turbine shaft speed $N_{pt}$ may be in a range of approximately 90% of its maximum speed while the gas generator speed $N_{gg}$ has been brought down to at or near its low idle speed of approximately 50% maximum gas generator speed.

This third mode of deceleration, termed power feedback braking, is manually selected by closing power feedback switch 466. In response the electronic control module 68 generates signals which ultimately result in mechanical interconnection of the gas generator shaft with the power turbine shaft such that the inertia of the gas generator shaft is imposed upon the drive train of the vehicle to produce additional braking effects thereon. More particularly, upon closing switch 466, AND gate 506 generates a signal to AND gate 504 since the accelerator level is below a preselected point $a^*$ causing function generator 488 to generate a signal to AND gate 506, and since the gas generator is operating at a speed above 45% of its rated value as determined by element 474. Element 472 develops a signal through line 480 to AND gate 504 since power turbine speed is greater than gas generator speed in this operational mode. Element 470 also notes that the effective relative speeds of the gas generator shaft and power turbine shaft are outside a preselected limit, such as the plus or minus 5% noted at comparator 470. Accordingly element 470 does not generate a signal to AND gates 502, 504. More specifically the element 470 is not necessarily comparing thee actual relative speeds of the gas generator power turbine shafts. Rather, the element is so arranged that it only generates a signal to AND gates 502, 504 whenever the relative speeds of the shafts 520, 522 in the power feedback clutch 84 are within the preselected predetermined limits of one another. Thus the comparator 468 will compensate, as required, for differences in the actual speeds of the gas generator and power turbine shaft, as well as the gear ratios of the two respective drive trains 78 and 80 associated with the two shafts 502, 522 of the feedback clutch 84.

Because of the difference between $N_{pt}$ and $N_{gg}$, no signal from element 470 is transmitted to either AND gate 502 or 504. As noted schematically by the circle associated with the input from element 470 to AND gate 504, that input is inverted and AND gate 504 is now effective to generate an output signal since no signal is coming from element 470, and since signals are being received from AND gate 506 and element 472. The output signal from AND gate 504 accomplishes two functions. First, a signal of 50% $N_{gg}$ magnitude is generated in function generator 566 and added to the constant 50% bias signal of summer 570. The resulting signal is equivalent to a 100% $N_{gg}$ speed command. Secondly, the output from AND gate 504 passes through OR gate 562 to produce a signal to solenoid 257. This signal is of sufficient magnitude to shift solenoid 257 to its FIG. 6D position clearing opening 178 for substantial fuel flow to the combustor. It will be apparent that full energization of solenoid 257 to its FIG. 6D position is essentially a flase accelerator lever signal to the fuel lever 226 causing lever 226 to rotate to a position normally caused by depressing accelerating lever 184 to its maximum flow position. Secondly, the signal from summer 570 is also an input to element 497 such that an artificial full throttle signal is generated which overrides the energization signal which is maintaining the guide vanes in their FIG. 16 braking position during the second mode of deceleration discussed previously. The energization of the guide vane solenoid 426 causes increase of pressure in conduit 394 allowing the springs 382–385 to shift the piston 366 and the associated guide vanes toward their FIG. 14 "neutral" position.

Accordingly, it will be seen that the signal from AND gate 504 produces an acceleration signal to the engine, placing the guide vanes 120, 122 in their neutral position such that maximum pressure ratio is developed across the gas generator turbine 102, and at the same time fuel flow to the combustor 98 has been greatly increased. In response, the gas generator section begins increasing in speed rapidly toward a value such that the speed of shaft 522 of the feedback clutch approaches the speed of its other shaft 520.

Once the power turbine and gas generator shaft speeds are appropriately matched such that the two shafts 520, 522 of the feedback clutch are within the preselected limits determined by element 470 of the electronic control module, electronic control module develops a positive signal to both AND gates 502, 504. This positive signal immediately stops the output signal from AND gate 504 to de-energize the proportional solenoid 257 of the fuel governor and again reduce fuel flow back toward a minimum value, and at the same time stops the override signal to element 500 such that the guide vane 120, 122 are again shifted back to their FIG. 16 braking disposition in accord with the operation discussed above with respect with the second mode of deceleration.

The logic element AND gate 502 now develops a positive output signal to operate to driver 516 and energize clutch actuator solenoid valve 518. In response the clutch 84 becomes engaged to mechanically interlock the shafts 520 and 522 as well as the gas generator and power turbine shafts 76, 82. Incorporation of the logic element 470 in the electronic control module, in addition to the other functions described previously, also assures that since the two shafts 520, 522 are in near synchronous speed, relatively small torque miss-match across the plates 524, 526 of the clutch is experienced. Accordingly, the size of clutch 84 can be relatively small. Thus it will be seen that the electronic control module 68 operates automatically first to increase gas generator speeed to essentially match power turbine speed, and then to automatically return the guide vanes to their FIG. 16 braking disposition at the same time as clutch 84 is engaged.

This interconnection of the gas turbine engine drive train with the gas generator shaft 76 causes the rotational inertia of gas generator 76 to assist in decelerating the vehicle. It has been found that for a 450 to 600 horsepower class engine described, this power feedback braking mode adds in the neighborhood of 200 to 250 horsepower braking in addition to the 200 horsepower braking effects produced by the positioning of guide vane 120, 122 in their FIG. 16 position. Because the fuel governor is again severely restricting flow through orifice 178, the fuel flow is controlled by deceleration window 286 permitting the gas generator section to decelerate while maintaining the combustion process in combustor 98. Thus reduction of fuel flow provides the deceleration effect of the rotational inertia of the gas generator upon the drive train of the vehicle.

It will be apparent from the foregoing that the present invention provides substantial braking for deceleration purposes while still utilizing the optimum operating characteristics of a free turbine type of a gas turbine engine with the gas generator section mechanically interconnected with the power turbine section only in a specific instance of a manually selected "severe" third mode type of deceleration operation. Throughout all deceleration modes and engine operation, a continuous combustion process is maintained in the combustor. Thus substantial deceleration occurs without extinguishing the combustion process therein.

This power feedback braking operation can be deactivated in several ways: manually by opening switch 466 to stop the output signal from AND gate 506; providing a NOT signal to turn off driver 516 and solenoid 518 to disengage clutch 84. Furthermore, if the manual switch is not opened and the engine continues to decelerate, element 474 also operates to deactivate the power feedback operation whenever gas generator speed $N_{gg}$ reduces to a value below 45% of its maximum rate of speed. Also, depression of the accelerator to a value of above a* also deactivates the power feedback operation by stopping an output signal from AND gate 506.

From the foregoing it will now be apparent that the present invention provides an improved cycle of operation for a gas turbine engine peculiarly adapted for operating a ground vehicle in a safe, familiar manner while still retaining the inherent benefits of a gas turbine engine. More specifically, by utilization of a free turbine type engine greater adaptability and variability of engine operation is provided. At the same time the engine can operate throughout its entire operating cycle while maintaining a continuous combustion process within the combustor 98. This avoids various problems of operation and service life associated with repeated start and stop of the combustion process. The novel cycle contemplates a utilization of a combustor 98 having choked nozzles 102 to provide a variable pressure within the combustor as the speed of the gas generator section varies. Gas generator section speed is normally trimmed to a preselected value relative to the position of the accelerator lever 184, while the guide vanes 120, 122 operate to trim the turbine inlet temperature $T_4$ to a preselected substantially constant value to maintain high engine operational efficiency. Further, the guide vane control operates indirectly to alter the fuel flow through fuel governor 60 by altering the speed of the gas generator section such that the various controls are operable in an integral manner without counteracting one another. At the same time a trim of power turbine shaft speed $N_{pt}$ is provided by the guide vane control 66.

Furthermore it will be seen that the present invention provides the gas turbine engine peculiarly adapted for driving a ground vehicle in that responsive acceleration similar to that produced by an internal combustion engine is provided by both the automatic high idle operation as well as by the manner of acceleration of the gas turbine engine. Such is accomplished by first altering the work split to develop maximum power to the gas generator section. The scheduling valve control 62 then acts in regenerative fashion to increase fuel flow to the combustor in such a manner that gas generator speed is increased while maintaining a substantially constant maximum turbine inlet temperature $T_4$ thereby producing maximum acceleration without over heating the engine. Yet the scheduling valve also limits $T_6$ during the initial portion of acceleration when turbine "stalling" conditions are prevalent. Acceleration is then completed once substantial acceleration of the gas generator section is accomplished, by re-altering the power split to develop greater power across the power turbine wheels 116, 118.

It is further noted that the present invention provides an improved method and apparatus for decelerating the vehicle in a three stage type of operation by first reducing fuel flow, then by placing the guide vanes in the braking mode, and then by manually selecting the power feedback operation.

The primary operating elements of the fuel governor 60, scheduling valve 62, and guide vane control 66 are hydromechanical in nature. This, in conjunction with the operation of solenoid 426 of the guide vane control which is normally energized, provides an engine and control system peculiarly adapted to provide safe engine operation in the event of various failure modes. More particularly, in the event of complete loss of electrical power to the electronic control module 68, the mechanical portion of fuel governor 60 continues to adjust fuel flow in relation to that selected by accelerator lever 184. Scheduling valve 62 is in no way affected by such electrical failure and is capable of controlling acceleration and/or deceleration to both prevent over heating of the engine during acceleration as well as to maintain combustion during deceleration. They hydromechanical portion of the vane actuator control will still be operable in the event of electrical failure and capable of adjusting the guide vanes as appropriate to maintain functional engine operation. Upon electrical failure the solenoid 426 of the guide vane control becomes de-energized causing loss of pressure upon face 393 of the control piston 392. However, the speed control afforded by lever 396 is still maintained and the guide vanes can be appropriately positioned to maintain functional engine operation during this failure of the electrical system. Thus, while certain desirable features of the engine control will be lost in the event of electrical failure, the engine can still function properly with appropriate acceleration and deceleration so that the vehicle may still be operated in a safe manner even though at a possible loss of operational efficiency and loss of the ability to provide power feedback braking.

From the foregoing it will be apparent that the present invention provides an improved method of automatically setting and resetting the idle of the gas generator section so that the engine is highly responsive in developing an increase in output power such as when contemplating acceleration of the vehicle. Further the present invention provides an improved method of controlling fuel flow hydromechanically in relation to gas generator speed, as well as overriding normal speed control operation of the fuel governor to increase or decrease fuel flow in response to occurrence of various conditions which energize either of the solenoids 239, 257. Further the present invention provides an improved method for controlling fuel flow to the combustor during acceleration such that constant turbine inlet temperature $T_4$ is maintained throughout, while also controlling fuel flow during deceleration to avoid extinguishing the combustion process within a combustor. The invention further contemplates an improved method of controlling guide vane position in such an engine both by hydromechanical operation to control speed of a rotor such as turbine wheels 116, 118, and by electrical override operation dependent upon the amount of energization of the proportional solenoid 426.

The foregoing has described a preferred embodiment of the invention in sufficient detail that those skilled in the art may make and use it. However, this detailed description should be considered exemplary in nature and not as limiting to the scope and spirit of the present invention as set forth in the appended claims.

Having described the invention with sufficient clarity that those skilled in the art may make and use it, what is claimed as new and desired to be secured by Letters Patent is:

1. A free turbine type gas turbine engine, comprising:
   a gas generator having an air inlet, a compressor, a combustor, a turbine, and a drive shaft interconnecting the turbine and compressor;
   means for delivering fuel to said combustor to maintain a combustion process therein and produce a motive gas output flow to said gas generator turbine;
   a power turbine section downstream of said gas generator turbine and driven by said output gas flow and having a power output shaft;
   means for adjusting the incidence of said motive gas output flow onto said power turbine section to alter power transmitted to drive said power turbine section drive shaft;
   means for sensing the speed of said gas generator section drive shaft, the temperature of said motive gas output delivered to said gas generator turbine, and the temperature of the motive gas flow being exhausted from said power turbine section; and
   control means operatively coupled with said sensing means for controlling fuel flow to said gas generator section in relation to the sensed speed of said gas generator section, and for controlling said adjusting means in relation to the sensed temperature of said motive gas output flow delivered to said gas generator turbine and the temperature of said motive gas flow exhausted from said power turbine section to prevent either of said sensed temperatures from exceeding preselected, different maximum values thereof.

2. A gas turbine engine as set forth in claim 1, wherein said control means are operable to maintain the speed of said gas generator at a first preselected minimum idle speed during idling operation, said control means including means selectively energizable for maintaining gas generator speed at a second, preselected idle speed substantially higher than said first idle speed.

3. A gas turbine engine as set forth in claim 2, wherein said control means includes a fuel lever for metering fuel flow to said gas generator section.

4. A gas turbine engine as set forth in claim 3, wherein said selectively energizable means includes a uni-directional solenoid having a plunger engageable with said fuel lever upon energization of said solenoid.

5. A gas turbine engine as set forth in claim 1, wherein said adjusting means comprises a set of variable incidence guide vanes disposed in the path of said motive gas flow.

6. A method of operating a free turbine type gas turbine engine having a gas generator section and a power turbine section, said method comprising the steps of:
   delivering fuel flow to the gas generator section to maintain a combustion process therein and produce a motive gas output floww therefrom for sequentially driving a turbine of the gas generator section and said power turbine section;
   sensing the speed of the gas generator section, the temperature of input motive gas flow delivered to the turbine of said gas generator section, and the temperature of motive gas flow being exhausted from the power turbine section;

controlling fuel flow to the gas generator section in relation to the sensed speed of the gas generator section; and adjusting the incidence of motive output flow onto the power turbine section to alter the power transmitted to said power turbine section in relation to both of said sensed temperatures to maintain both said sensed temperatures below preselected, different maximum values thereof.

* * * * *